(12) United States Patent
Si et al.

(10) Patent No.: US 11,082,210 B2
(45) Date of Patent: Aug. 3, 2021

(54) METHOD FOR SEQUENTIALLY ENCRYPTING AND DECRYPTING SINGLY LINKED LISTS BASED ON DOUBLE KEY STREAM CIPHERS

(71) Applicants: Zhuhai College of Jilin University, Zhuhai (CN); Jilin University, Changchun (CN)

(72) Inventors: Yujuan Si, Zhuhai (CN); Liuqi Lang, Zhuhai (CN)

(73) Assignees: Zhuhai College of Jilin University, Zhuhai (CN); Jilin University, Changchun (CN)

( * ) Notice: Subject to any disclaimer, the term of this patent is extended or adjusted under 35 U.S.C. 154(b) by 175 days.

(21) Appl. No.: 16/463,351

(22) PCT Filed: Jun. 29, 2018

(86) PCT No.: PCT/CN2018/093664
§ 371 (c)(1),
(2) Date: May 22, 2019

(87) PCT Pub. No.: WO2019/214027
PCT Pub. Date: Nov. 14, 2019

(65) Prior Publication Data
US 2020/0412522 A1    Dec. 31, 2020

(30) Foreign Application Priority Data
May 11, 2018   (CN) .......................... 201810451030.2

(51) Int. Cl.
*H04L 29/06*   (2006.01)
*H04L 9/06*    (2006.01)
*H04L 9/00*    (2006.01)

(52) U.S. Cl.
CPC .............. *H04L 9/065* (2013.01); *H04L 9/001* (2013.01); *H04L 2209/08* (2013.01)

(58) Field of Classification Search
CPC . H04L 9/065; H04L 9/001; H04L 9/06; H04L 9/08; H04L 2209/08
See application file for complete search history.

(56) References Cited

U.S. PATENT DOCUMENTS 7,822,204 B2 * 10/2010 Yoshida ................ H04L 9/0852
                                                    380/268
8,218,759 B2 *  7/2012 Moffat .................. H04L 9/0643
                                                     380/28
(Continued)

FOREIGN PATENT DOCUMENTS

CN       1973481 A      5/2007
CN     104935429 A      9/2015
(Continued)

OTHER PUBLICATIONS

CPTO, China International Search Authority, International Search Report and Written Opinion dated Feb. 2, 2019 in International Patent Application No. PCT/CN2018/093664, 2 pages.
(Continued)

*Primary Examiner* — Hosuk Song
(74) *Attorney, Agent, or Firm* — Inskeep IP Group, Inc.

(57) ABSTRACT

A method for sequentially encrypting and decrypting singly linked lists based on double key stream ciphers comprises: establishing a plaintext set M according to a plaintext file; using the plaintext set M as an initial value and performing iterative decryption to obtain a ciphertext set C, wherein a key set P and an algorithm set A are used during the iterative decryption; for the ciphertext set C, performing multiple decryptions by calling the key set P and calling keys in the key set P, wherein a key set P and an algorithm set A are used during the decryptions; and, converting the obtained result of decryption into a plaintext file.

17 Claims, 5 Drawing Sheets

(56) References Cited

U.S. PATENT DOCUMENTS

| | | | | |
|---|---|---|---|---|
| 8,355,499 | B2* | 1/2013 | Asnaashari | H04L 9/0631 380/28 |
| 8,666,064 | B2* | 3/2014 | Choi | H04L 9/0637 380/28 |
| 8,751,822 | B2* | 6/2014 | Anderson | G06F 21/14 713/190 |
| 10,038,550 | B2* | 7/2018 | Gopal | H04L 9/0643 |
| 10,536,264 | B2* | 1/2020 | Ghosh | H04L 9/0618 |
| 2005/0240764 | A1 | 10/2005 | Koshy et al. | |
| 2008/0095370 | A1 | 4/2008 | Rose et al. | |

FOREIGN PATENT DOCUMENTS

| | | |
|---|---|---|
| CN | 105959118 A | 9/2016 |
| CN | 106953875 A | 7/2017 |
| CN | 109194461 A | 11/2019 |
| EP | 1747637 | 11/2005 |
| JP | 2007535000 A | 11/2007 |
| WO | WO2005/107386 A2 | 11/2005 |
| WO | WO2008/049046 A2 | 4/2008 |
| WO | WO2018/196634 A1 | 11/2018 |

OTHER PUBLICATIONS

NPL Zhang, Bin, "Design and Analysis of Stream Ciphers Past, Present and Future," (With English Abstract) *Journal of Cryptologic Research,* vol. 3/No. 6, Dec. 31, 2016, pp. 527-545.

* cited by examiner

| Encryption combination table | | | | | | |
|---|---|---|---|---|---|---|
| encryption mode | first encryption | state | second encryption | state | final state | |
| | p successive | r successive | failed | p successive | r successive | failed | 0 |
| | p successive | r successive | failed | p successive | r hashed | successful | 0 |
| | p successive | r successive | failed | p hashed | r successive | successful | 0 |
| | p successive | r successive | failed | p hashed | r hashed | failed | 0 |
| | p successive | r hashed | successful | p successive | r successive | failed | 0 |
| 4 | p successive | r hashed | successful | p successive | r hashed | successful | 1 |
| 3 | p successive | r hashed | successful | p hashed | r successive | successful | 1 |
| | p successive | r hashed | successful | p hashed | r hashed | failed | 0 |
| | p hashed | r successive | successful | p successive | r successive | failed | 0 |
| 2 | p hashed | r successive | successful | p successive | r hashed | successful | 1 |
| 1 | p hashed | r successive | successful | p hashed | r successive | successful | 1 |
| | p hashed | r successive | successful | p hashed | r hashed | failed | 0 |
| | p hashed | r hashed | failed | p successive | r successive | failed | 0 |
| | p hashed | r hashed | failed | p successive | r hashed | successful | 0 |
| | p hashed | r hashed | failed | p hashed | r successive | successful | 0 |
| | p hashed | r hashed | failed | p hashed | r hashed | failed | 0 |

Fig.6

METHOD FOR SEQUENTIALLY ENCRYPTING AND DECRYPTING SINGLY LINKED LISTS BASED ON DOUBLE KEY STREAM CIPHERS

RELATED APPLICATIONS

This application is the U.S. National Phase of and claims priority to International Patent Application No. PCT/CN2018/093664, International Filing Date Jun. 29, 2018, entitled Method For Sequentially Encrypting And Decrypting Singly Linked Lists Based On Double Key Stream Ciphers; which claims benefit of Chinese Application No. 201810451030.2 filed May 11, 2018 entitled One-way Chain Table Sequence Encryption And Decryption Method Based On Dual-Key Stream Ciphers; both of which are incorporated herein by reference in their entireties.

FIELD

The disclosure relates to a method for sequentially encrypting and decrypting singly linked lists based on double key stream ciphers, and belongs to the technical field of information security.

BACKGROUND

Encryption of network communication information, encryption of aerospace digital remote control commands and data, encryption of digital remote communication data of unmanned aerial vehicles, encryption of digital communication command system information of airborne early warning aircrafts, encryption of digital communication data of GPS satellites, encryption of mobile phone communication, encryption of e-mails, encryption of electronic finance data transmission and the like have been widely used. In terms of image encoding, images in various formats can be encrypted to protect the intellectual property of images. After military, political and diplomatic files are encrypted, these files can be transmitted by a civil communication network, so that the cost of file transfer is saved.

Since the Snowden event, all countries have stepped up research and development on their own information security. The reason why the United States can acquire information contents of other countries is mainly in the following several aspects.

Firstly, the United States has the technological advantages of the communication technology and the right of super-user management of the Internet.

Secondly, mail servers (the relevant departments in the United States force service providers of the mail servers to provide mail information), information passing through routers (the relevant departments in the United States force communication service departments and communication equipment suppliers to provide information interception functions), information of mobile phone communication and the like can be intercepted by other persons.

Thirdly, lots of information is transmitted as unencrypted plain code information in the Internet. Thus, it is easier for other persons to acquire information (e.g., the leak of love letters and emails from the U.S. commander in Afghanistan).

Fourthly, the United States has invested enormous material resources, human resources and financial resources. A large team for collecting, analyzing, screening and processing network information is organized. Information about other countries is collected (e.g., the interception event of German Chancellor Angela Merkel's mobile phone communication information).

Stream ciphers are also referred to as sequence ciphers. In the existing research state of stream ciphers, the analysis and design of stream ciphers are often used for military and diplomatic communications in a country. Therefore, the development and design of stream ciphers are basically carried out in a confidential state, and scholars and experts who research stream ciphers in each country have almost no published treatises in this respect. In each country, the stream cipher technology and products are restrained in export as military products. Due to their many advantages incomparable to other ciphers, the stream ciphers have become one of the most common cryptographic systems today.

The current research directions for the stream cryptography are based on mathematical models, and the encryption and decryption of stream ciphers are realized by complicated algebraic operations, Boolean algebraic operations, pseudorandom numbers, shift registers, linear feedback and the like. Some successful methods in this respect include A5 method, S-box method, RC4 method, K2 method and the like. These methods are not public. After years of research, some mature means for encryption and decryption have been established. At present, many scholars have studied the attack and decipherment of the ciphertext encrypted by the above methods. Consequently, the security of the ciphertext encrypted by the above methods faces a great challenge.

At present, the stream ciphers are mainly designed by methods based on the system theory, and the key stream sequences are mainly generated by generation of pseudorandom sequences with a linear feedback shift register. A method for generating pseudorandom sequences comprises: feedbacking a sequence of a shift register; generating a feedforward sequence by a linear shift register and a non-linear feedforward function; generating a clock-controlled sequence; combining network sequences; carrying the shift resister; using a cellular automaton; using a chaos theory; and the like.

SUMMARY

In view of the deficiencies of the prior art, the technical solutions of the disclosure provide a method for sequentially encrypting and decrypting singly linked lists based on double key stream ciphers. The used chaotic stream is different from the chaotic steams in the past. The chaotic steam provided in the disclosure may be in any file mode, but is not a chaotic stream generated by a function or signal generator, so that this chaotic stream may be referred to as a true random sequence rather than a dynamically parasitic method of a pseudorandom sequence. Even if this method is guessed, since the chaotic stream is an unordered sequence, it is almost impossible to realize decipherment. If an exhaustion method is used, it is almost impossible to implement mathematically. Moreover, since the number of exhaustion times is the second power of 8 times of the number of bytes (N) of the plaintext, i.e., $2^{8n}$, it is also almost impossible to implement by a computer.

The technical solutions of the disclosure provide a method for sequentially encrypting and decrypting singly linked lists based on double key stream ciphers, including steps of: establishing a plaintext set M according to a plaintext file, wherein the plaintext can be any resolvable file; using the plaintext set M as an initial set and performing sequentially iterative encryption to obtain a ciphertext set C, wherein a reference string, a key set P and an algorithm set A are used jointly in the iterative encryption, and the reference string is $2^m$ bytes, where m>=0; the iterative encryption includes: acquiring any values of the plaintext set M, the ciphertext set C and the key set P as initial values and bit pointers corresponding to the initial values, performing two iterative encryptions on the plaintext set M through the bit pointers, the reference string and an encryption algorithm in the algorithm set A to obtain a ciphertext set C, wherein the plaintext set M and the key set P are not successive or hashed simultaneously as for a pointer used for encryption; for the ciphertext set C, performing multiple decryptions by calling the key set P, wherein the key set P and the algorithm set A are used during the encryption, wherein the key set P and the algorithm set A are shared by the encryption and the decryption, and the sets M and C are doubly circular linked lists, wherein the plaintext set M and the key set P are successive or hashed when the bit pointers for encryption is different; wherein the decryption includes: retrieving the iteratively encrypted initial values, establishing bit pointers corresponding to the initial values, performing two decryptions on the ciphertext set C in combination with the reference string and an encryption algorithm in the algorithm set A to obtain a plaintext set M, and converting the plaintext set M into a plaintext file.

In accordance with the method for sequentially encrypting and decrypting singly linked lists based on double key stream ciphers, all the plaintext set M, the ciphertext set C, the key set P and the algorithm set A are character sets consisting of binary code elements.

In accordance with the method for sequentially encrypting and decrypting singly linked lists based on double key stream ciphers, the establishing a plaintext set M according to a plaintext file includes: reading a plaintext file to obtain the number of bytes n of the plaintext file; and, establishing a plaintext set M that is an ordered set, wherein $M=\{x_0 x_1 \wedge x_{n-1}\}$, where $x_i=\{0,1\}$ and i satisfies a condition of 0<=i<=n−1, and as a circular linked list, for the M, $x_{n-1}$ is followed by $x_0$.

In accordance with the method for sequentially encrypting and decrypting singly linked lists based on double key stream ciphers, the method further includes: the key set P includes a first key subset and a second key subset, wherein the first key subset is $P_0=\{y0_0 y0_1 \wedge y0_{n-1}\}$, where $y0_{j0}=\{0,1\}$, j0 satisfies a condition of 0<=j0<=n−1, and $P_0$ is an ordered set; the second key subset is $P_1=\{y1_0 y1_1 \wedge y1_{n-1}\}$, where $y1_{j1}=\{0,1\}$, j1 satisfies a condition of 0<=j1<=n−1, and $P_1$ is an ordered set; the first key subset $P_0$ and the second key subset are singly circular linked lists; for $P_0$, $y0_{n-1}$ is followed by $y0_0$; and for $P_1$, $y1_{n-1}$ is followed by y1; and, both the set $P_0$ and the set $P_1$ are singly circular linked lists.

In accordance with the method for sequentially encrypting and decrypting singly linked lists based on double key stream ciphers, the method further includes: the ciphertext set C includes a first ciphertext subset and a second ciphertext subset, wherein the first ciphertext subset is $C_0=\{z0_0 z0_1 \wedge z0_{n-1}\}$, where $y0_{k0}=\{0,1\}$, k0 satisfies a condition of 0<=k0<=n−1, and $C_0$ is an ordered set; the second key subset is $C_1=\{z1_0 z1_1 \wedge z1_{n-1}\}$, where $z1_{k1}=\{0,1\}$, k1 satisfies a condition of 0<=k1<=n−1, and $C_1$ is an ordered set; the first key set $C_0$ and the second key set $C_1$ are singly circular linked lists; for $C_0$, $z0_{n-1}$ is followed by $z0_0$; and for $C_1$, $z1_{n-1}$ is followed by $z1_0$.

In accordance with the method for sequentially encrypting and decrypting singly linked lists based on double key stream ciphers, the method further includes: the encryption step of using the plaintext set M as an initial value and performing iterative encryption to obtain a ciphertext set C includes four failed encryption methods, eight half-encryption methods and four double-key encryption methods, all the failed encryption methods and the half-encryption methods are discarded, and the four double-key encryption method are executed, wherein the four double-key encryption methods include sequentially encrypting according to a pointer of a circular linked list.

In accordance with the method for sequentially encrypting and decrypting singly linked lists based on double key stream ciphers, the method further includes: using any initial value $i_0$ (where 0<=$i_0$<=n−1) as an initial value of the set M and reserving this initial value; using any initial value $i_1$ (where 0<=$i_1$<=n−1) as an initial value of the set $C_0$, and reserving this initial value; using any initial value $j_0$ (where 0<=$j_0$<=n−1) as an initial value of the set $P_0$, and reserving this initial value; using any initial value $j_1$ (where 0<=j i<=n−1) as an initial value of the set $P_1$, and reserving this initial value; using any initial value $k_0$ (where 0<=$k_0$<=n−1) as an initial value of the set $C_0$, and reserving this initial value; using any initial value $k_1$ (where 0<=$k_1$<=n−1) as an initial value of the set $C_1$, and reserving this initial value; establishing a bit pointer p, and performing first encryption to let the p to point to an $x_i$ bit of the set M; establishing a bit pointer q, and performing first encryption to let the q to point to a $y0_{j0}$ bit of the set $P_0$; establishing a bit pointer r, and performing first encryption to let the r to point to a $z0_{k0}$ bit of the set $C_0$; establishing a bit pointer p, and performing second encryption to let the p to point to an $x_{i1}$ bit of the set $C_0$; establishing a bit pointer q, and performing second encryption to let the q to point to a $y1_{j1}$ bit of the set $P_1$; and, establishing a bit pointer r, and performing second encryption to let the r to point to a $z1_{k1}$ bit of the set $C_1$.

In accordance with the method for sequentially encrypting and decrypting singly linked lists based on double key stream ciphers, the double-key encryption methods further include: a first encryption method, including a first encryption step and a second encryption step, wherein the first encryption step includes: performing first encryption to let the p to point to an $x_{i0}$ bit of the set M; performing first encryption to let the q to point to a $y0_{j0}$ bit of the set $P_0$; performing first encryption to let the r to point to a $z0_{k0}$ bit of the set $C_0$; performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M, and letting the q to point to the $y0_{j0}$ bit of the set $P_0$; and, performing second traversal, judging whether *q is false, letting *r=*p and letting p, q and r to increase progressively if *q is false, letting p and q to increase progressively if *q is not false, ending the second traversal, obtaining encrypted $C_0$, writing the encrypted $C_0$ into a file, and ending the first encryption step; and, the second encryption step includes: performing first encryption to let the p to point to a $z0_{i1}$ bit of the encrypted set $C_0$; performing first encryption to let the q to point to a $y1_{j1}$ bit of the set $P_1$; performing first encryption to let the r to point to a $z1_{k1}$ bit of the set $C_1$; performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and, performing second traversal, judging whether *q is false, letting *r=*p and letting p, q and r to increase progressively if *q is false, letting p and q to increase progressively if *q is not false, ending the second traversal, obtaining encrypted $C_1$, writing the encrypted $C_1$ into a file, and ending the second encryption step; wherein p is hashed and r is successive in the first encryption step, and p is hashed and r is successive in the second encryption step.

In accordance with the method for sequentially encrypting and decrypting singly linked lists based on double key stream ciphers, the method further includes: a first encryption method, including a first encryption step and a second encryption step, wherein the first encryption step includes: performing first encryption to let the p to point to an $x_{i0}$ bit of the set M; performing first encryption to let the q to point to a $y0_{j0}$ bit of the set $P_0$; performing first encryption to let the r to point to a $z0_{k0}$ bit of the set $C_0$; performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M and letting the q to point to the $y0_{j0}$ bit of the set $P_0$; and, performing second traversal, judging whether *q is false, letting *r=*p and letting p, q and r to increase progressively if *q is false, letting p and q to increase progressively if *q is not false, ending the second traversal, obtaining encrypted $C_0$, writing the encrypted $C_0$ into a file, and ending the first encryption step; and, the second encryption step includes: performing first encryption to let the p to point to a $z0_{i1}$ bit of the encrypted set $C_0$; performing first encryption to let the q to point to a $y1_{j1}$ bit of the set $P_1$; performing first encryption to let the r to point to a $z1_{k1}$ bit of the set $C_1$; performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and, performing second traversal, judging whether *q is false, letting *r=*p and letting p, q and r to increase progressively if *q is false, letting p and q to increase progressively if *q is not false, ending the second traversal, obtaining encrypted $C_1$, writing the encrypted $C_1$ into a file, and ending the second encryption step; wherein p is hashed and r is successive in the first encryption step, and p is successive and r is hashed in the second encryption step.

In accordance with the method for sequentially encrypting and decrypting singly linked lists based on double key stream ciphers, the method further includes: a first encryption method, including a first encryption step and a second encryption step, wherein the first encryption step includes: performing first encryption to let the p to point to an $x_{i0}$ bit of the set M; performing first encryption to let the q to point to a $y0_{j0}$ bit of the set $P_0$; performing first encryption to let the r to point to a $z0_{k0}$ bit of the set $C_0$; performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M and letting the q to point to the $y0_{j0}$ bit of the set $P_0$; and, performing second traversal, judging whether *q is false, letting *r=*p and letting p, q and r to increase progressively if *q is false, letting p and q to increase progressively if *q is not false, ending the second traversal, obtaining encrypted $C_0$, writing the encrypted $C_0$ into a file, and ending the first encryption step; and, the second encryption step includes: performing first encryption to let the p to point to a $z0_{i1}$ bit of the encrypted set $C_0$; performing first encryption to let the q to point to a $y1_{j1}$ bit of the set $P_1$; performing first encryption to let the r to point to a $z1_{k1}$ bit of the set $C_1$; performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and, performing second traversal, judging whether *q is false, letting *r=*p and letting p, q and r to increase progressively if *q is false, letting p and q to increase progressively if *q is not false, ending the second traversal, obtaining encrypted $C_1$, writing the encrypted $C_1$ into a file, and ending the second encryption step; wherein p is successive and r is hashed in the first encryption step, and p is hashed and r is successive in the second encryption step.

In accordance with the method for sequentially encrypting and decrypting singly linked lists based on double key stream ciphers, the method further includes: a first encryption method, including a first encryption step and a second encryption step, wherein the first encryption step includes: performing first encryption to let the p to point to an $x_{i0}$ bit of the set M; performing first encryption to let the q to point to a $y0_{j0}$ bit of the set $P_0$; performing first encryption to let the r to point to a $z0_{k0}$ bit of the set $C_0$; performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M, and letting the q to point to the $y0_{j0}$ bit of the set $P_0$; and, performing second traversal, judging whether *q is false, letting *r=*p and letting p, q and r to increase progressively if *q is false, letting p and q to increase progressively if *q is not false, ending the second traversal, obtaining encrypted $C_0$, writing the encrypted $C_0$ into a file, and ending the first encryption step; and, the second encryption step includes: performing first encryption to let the p to point to a $z0_{i1}$ bit of the encrypted set $C_0$; performing first encryption to let the q to point to a $y1_{j1}$ bit of the set $P_1$; performing first encryption to let the r to point to a $z1_{k1}$ bit of the set $C_1$; performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and, performing second traversal, judging whether *q is false, letting *r=*p and letting p, q and r to increase progressively if *q is false, letting p and q to increase progressively if *q is not false, ending the second traversal, obtaining encrypted $C_1$, writing the encrypted $C_1$ into a file, and ending the second encryption step; wherein p is successive and r is hashed in the first encryption step, and p is successive and r is hashed in the second encryption step.

In accordance with the method for sequentially encrypting and decrypting singly linked lists based on double key stream ciphers, further including decryption methods corresponding to the double-key encryption methods, including: retrieving initial values $i_0$, $i_1$, $j_0$, $j_1$, $k_0$ and $k_1$ for decryption; a first decryption method including a first decryption step and a second decryption step, wherein the first decryption step includes: performing first decryption to let the p to point to a $z0_{i1}$ bit of the encrypted set $C_0$; performing first decryption to let the q to point to a $y1_{j1}$ bit of the set $P_1$; performing first decryption to let the r to point to a $z1_{k1}$ bit of the set $C_1$; performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and, performing second traversal, judging whether *q is false, letting *r=*p and letting p, q and r to increase progressively if *q is false, letting p and q to increase progressively if *q is not false, ending the second traversal, obtaining decrypted $C_0$, writing the decrypted $C_0$ into a cipher file, and ending the first decryption step; and, the second decryption step includes: performing second encryption to let the p to point to an $x_{i0}$ bit of the set M; performing second encryption to let the q to point to a $y0_{j0}$ bit of the set $P_0$; performing second encryption to let the r to point to a $z0_{k0}$ bit of the set $C_0$; performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M, and letting the q to point to the $y0_{j0}$ bit of the set $P_0$; and, performing second traversal, judging whether *q is false, letting *r=*p and letting p, q and r to increase progressively if *q is false, letting p and q to increase progressively if *q is not false, ending the second traversal, obtaining a plaintext set M writing the decrypted plaintext set M into a plaintext file, and ending the second decryption step; wherein p is hashed and r is successive in the first decryption step, and p is hashed and r is successive in the second decryption step.

In accordance with the method for sequentially encrypting and decrypting singly linked lists based on double key stream ciphers, further including decryption methods corresponding to the double-key encryption methods, including: retrieving initial values $i_0$, $i_1$, $j_0$, $j_1$, $k_0$ and $k_1$ for decryption; a second decryption method including a first decryption step and a second decryption step, wherein the first decryption step includes: performing first decryption to let the p to point to a $z0_{i1}$ bit of the encrypted set $C_0$; performing first decryption to let the q to point to a $y1_{j1}$ bit of the set $P_1$; performing first decryption to let the r to point to a $z1_{k1}$ bit of the set $C_1$; performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and, performing second traversal, judging whether *q is false, letting *r=*p and letting p, q and r to increase progressively if *q is false, letting p and q to increase progressively if *q is not false, ending the second traversal, obtaining decrypted $C_0$, writing the decrypted $C_0$ into a cipher file, and ending the first decryption step; and, the second decryption step includes: performing second encryption to let the p to point to an $x_{i0}$ bit of the set M; performing second encryption to let the q to point to a $y0_{j0}$ bit of the set $P_0$; performing second encryption to let the r to point to a $z0_{k0}$ bit of the set $C_0$; performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M and letting the q to point to the $y0_{j0}$ bit of the set $P_0$; and, performing second traversal, judging whether *q is false, letting *r=*p and letting p, q and r to increase progressively if *q is false, letting p and q to increase progressively if *q is not false, ending the second traversal, obtaining a plaintext set M writing the decrypted plaintext set M into a plaintext file, and ending the second decryption step; wherein p is hashed and r is successive in the first decryption step, and p is successive and r is hashed in the second decryption step.

In accordance with the method for sequentially encrypting and decrypting singly linked lists based on double key stream ciphers, further including decryption methods corresponding to the double-key encryption methods, including: retrieving initial values $i_0$, $i_1$, $j_0$, $j_1$, $k_0$ and $k_1$ for decryption; a third decryption method including a first decryption step and a second decryption step, wherein the first decryption step includes: performing first decryption to let the p to point to a $z0_{i1}$ bit of the encrypted set $C_0$; performing first decryption to let the q to point to a $y1_{j1}$ bit of the set $P_1$; performing first decryption to let the r to point to a $z1_{k1}$ bit of the set $C_1$; performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and, performing second traversal, judging whether *q is false, letting *r=*p and letting p, q and r to increase progressively if *q is false, letting p and q to increase progressively if *q is not false, ending the second traversal, obtaining decrypted $C_0$, writing the decrypted $C_0$ into a cipher file, and ending the first decryption step; and, the second decryption step includes: performing second encryption to let the p to point to an $x_{i0}$ bit of the set M; performing second encryption to let the q to point to a $y0_{j0}$ bit of the set $P_0$; performing second encryption to let the r to point to a $z0_{k0}$ bit of the set $C_0$; performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M and letting the q to point to the $y0_{j0}$ bit of the set $P_0$; and, performing second traversal, judging whether *q is false, letting *r=*p and letting p, q and r to increase progressively if *q is false, letting p and q to increase progressively if *q is not false, ending the second traversal, obtaining a plaintext set M writing the decrypted plaintext set M into a plaintext file, and ending the second decryption step; wherein p is successive and r is hashed in the first decryption step, and p is hashed and r is successive in the second decryption step.

In accordance with the method for sequentially encrypting and decrypting singly linked lists based on double key stream ciphers, further including decryption methods corresponding to the double-key encryption methods, including: retrieving initial values $i_0$, $i_1$, $j_0$, $j_1$, $k_0$ and $k_1$ for decryption; a fourth decryption method including a first decryption step and a second decryption step, wherein the first decryption step includes: performing first decryption to let the p to point to a $z0_{i1}$ bit of the encrypted set $C_0$; performing first decryption to let the q to point to a $y1_{j1}$ bit of the set $P_1$; performing first decryption to let the r to point to a $z1_{k1}$ bit of the set $C_1$; performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and, performing second traversal, judging whether *q is false, letting *r=*p and letting p, q and r to increase progressively if *q is false, letting p and q to increase progressively if *q is not false, ending the second traversal, obtaining decrypted $C_0$, writing the decrypted $C_0$ into a cipher file, and ending the first decryption step; and, the second decryption step includes: performing second encryption to let the p to point to an $x_{i0}$ bit of the set M; performing second encryption to let the q to point to a $y0_{j0}$ bit of the set $P_0$; performing second encryption to let the r to point to a $z0_{k0}$ bit of the set $C_0$; performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M, and letting the q to point to the $y0_{j0}$ bit of the set $P_0$; and, performing second traversal, judging whether *q is false, letting *r=*p and letting p, q and r to increase progressively if *q is false, letting p and q to increase progressively if *q is not false, ending the second traversal, obtaining a plaintext set M, writing the decrypted plaintext set M into a plaintext file, and ending the second decryption step; wherein p is successive and r is hashed in the first decryption step, and p is successive and r is hashed in the second decryption step.

In accordance with the method for sequentially encrypting and decrypting singly linked lists based on double key stream ciphers, the algorithm set A includes at least one pair of an encryption algorithm and a corresponding decryption algorithm; and, the number of elements in the algorithm set A is denoted as sum(A), and sum(A) mod 2=0.

In accordance with the method for sequentially encrypting and decrypting singly linked lists based on double key stream ciphers, a key file corresponding to the key set P includes, but not limited to: a piece of audio, a video, a picture, an image, a graph, a pseudorandom code and a chaotic value.

The disclosure has the following beneficial effects: the method is simple and very difficult to decipher; it is easy to implement by computer algorithms and programming; it adopts the plaintext decryption, transmission, reception, and decryption is performed in accordance with a three-separation principle, so that the secrecy system is securer; the decryption method is unordered decryption, rather than conventional one-to-one or one-to-multiple decryption; transmission can be performed in existing public communication channels; no any auxiliary hardware device is required; implementations are completely realized by software; and, the key bytes can be in any length, and the decryption complexity will increase with the increase of the length of the key bytes.

BRIEF DESCRIPTION OF THE DRAWINGS

Figure 2:
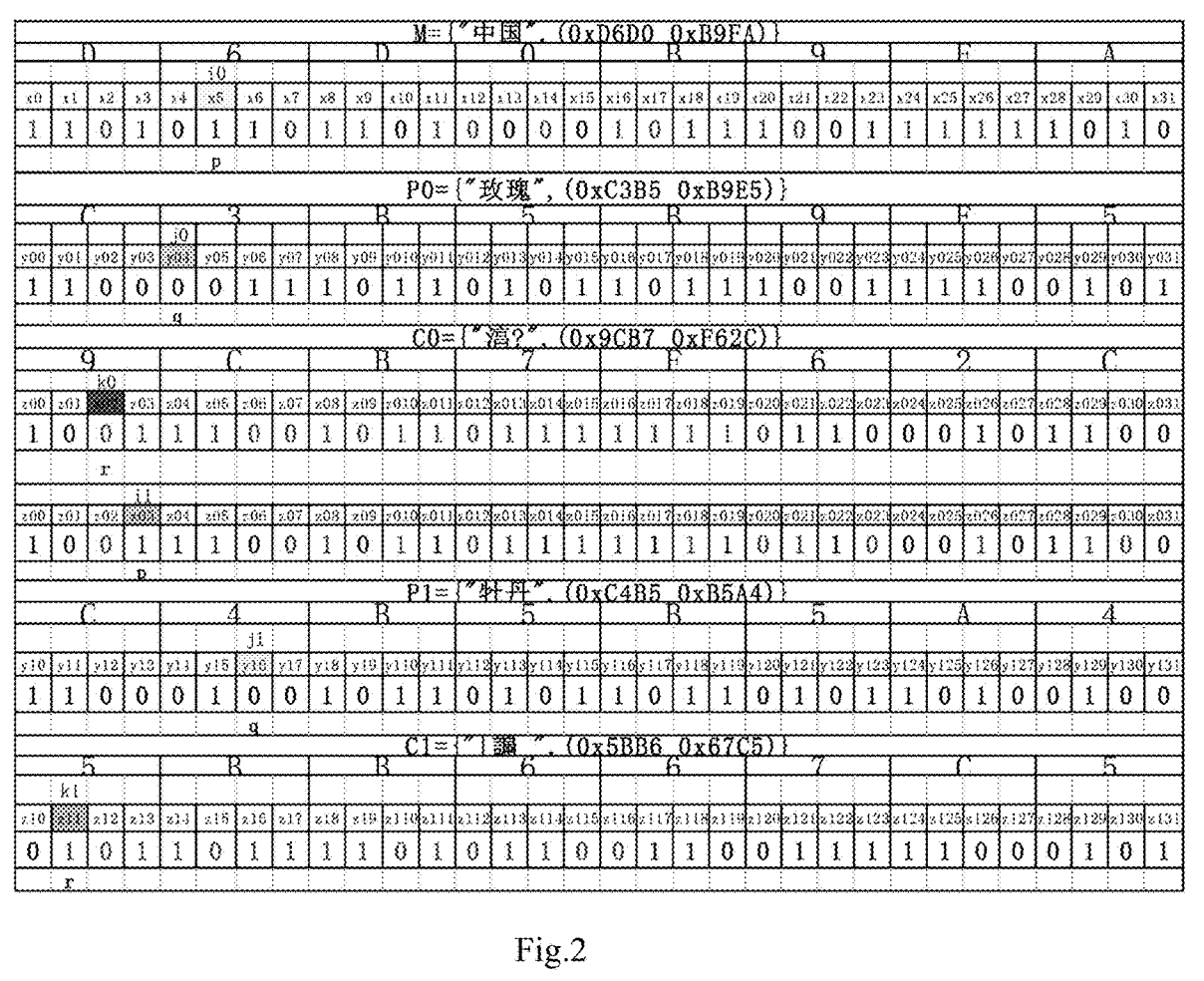

FIG. 2 shows a detail diagram of encryption and decryption in cases of "p being hashed and r being successive" and "p being hashed and r being successive" according to an embodiment of the disclosure;

Figure 3:
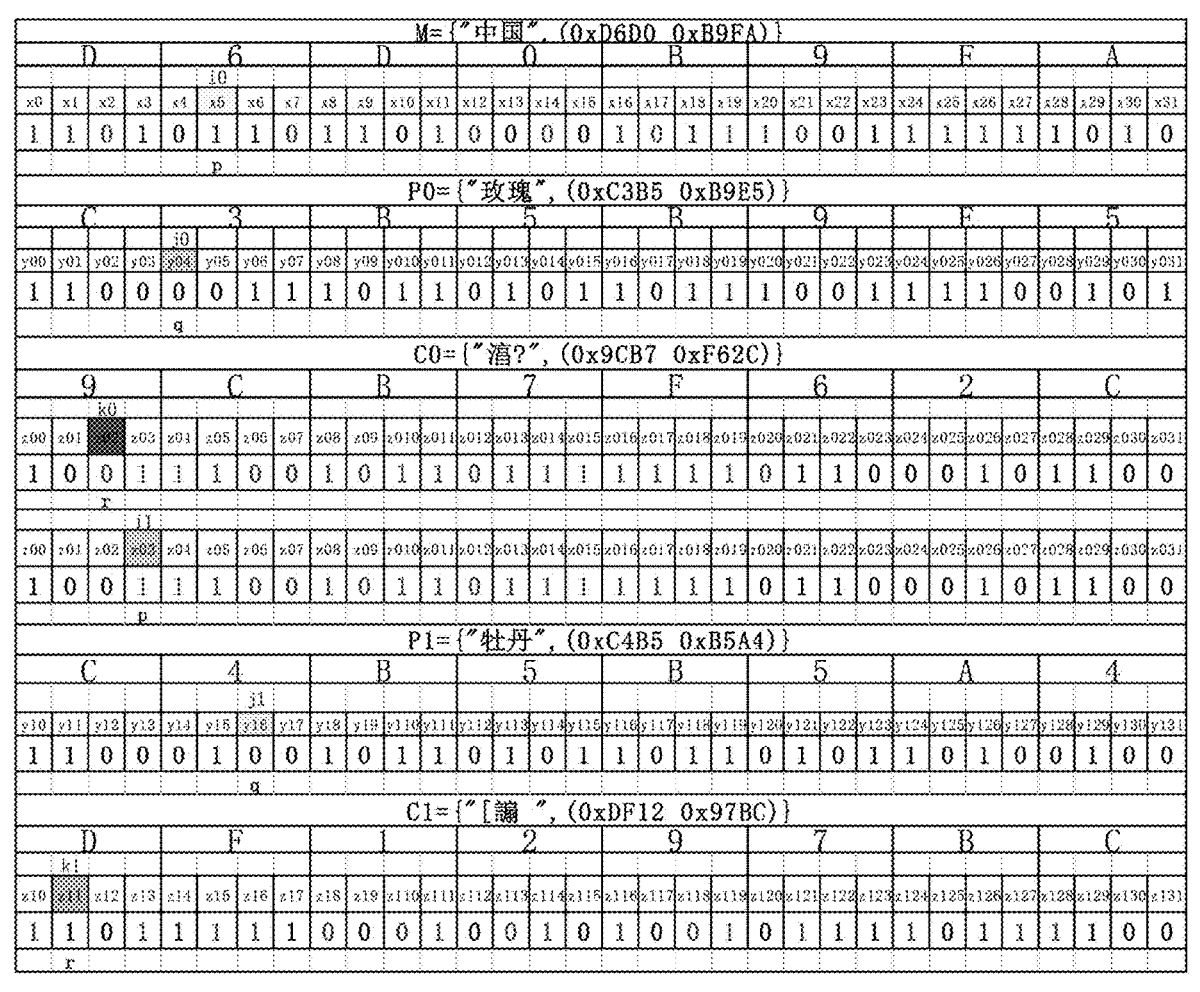

FIG. 3 shows a detail diagram of encryption and decryption in cases of "p being hashed and r being successive" and "p being successive and r being hashed" according to an embodiment of the disclosure;

Figure 4:
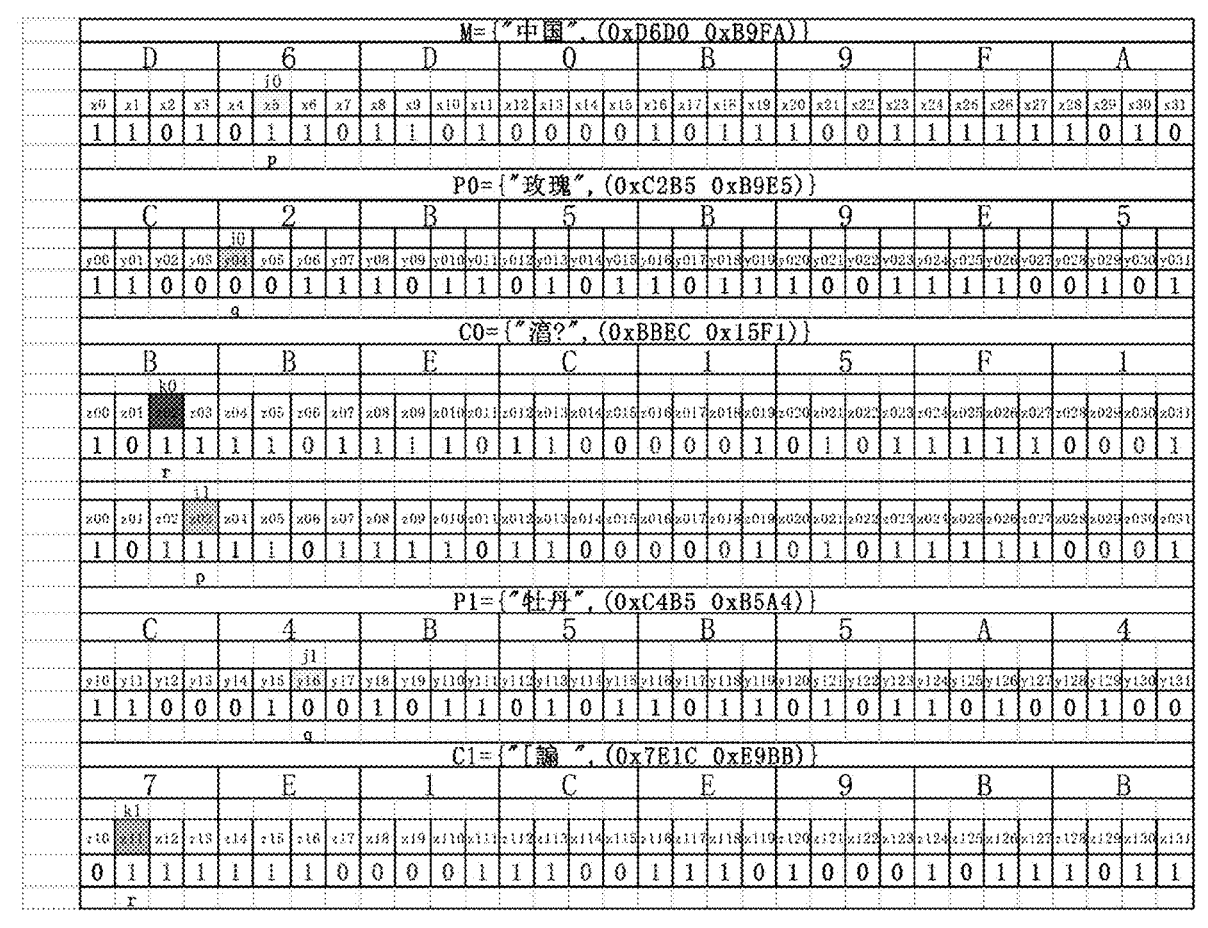

FIG. 4 shows a detail diagram of encryption and decryption in cases of "p being successive and r being hashed" and "p being hashed and r being successive" according to an embodiment of the disclosure;

FIG. 5 shows a detail diagram of encryption and decryption in cases of "p being successive and r being hashed" and "p being successive and r being hashed" according to an embodiment of the disclosure; and FIG. 6 shows a diagram of encryption combinations according to an embodiment of the disclosure.

DETAILED DESCRIPTION OF THE DISCLOSURE

Figure 1:
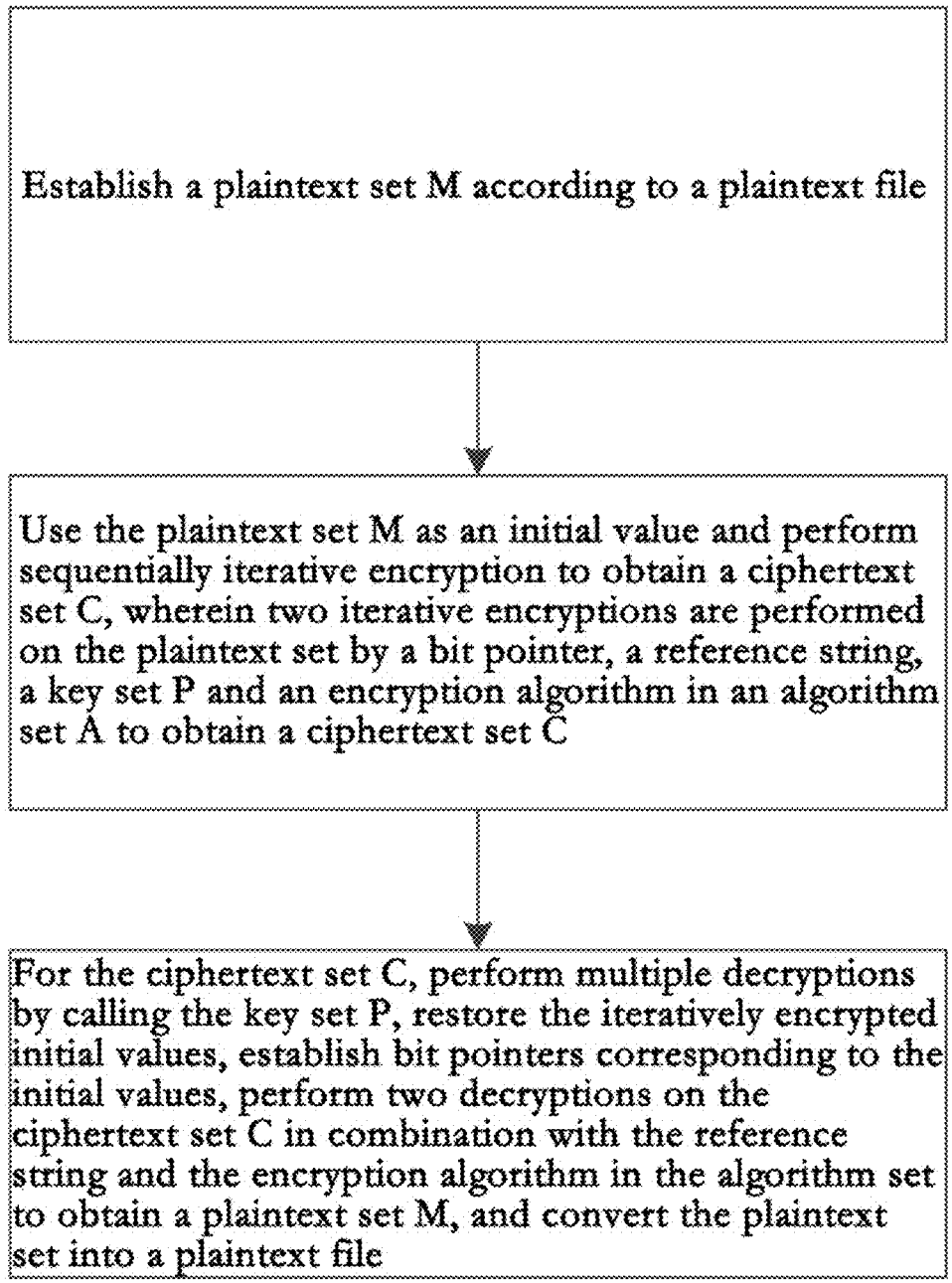
FIG. 1 shows an overall flowchart of according to an embodiment of the disclosure.

To make the objectives, technical solutions and advantages of the disclosure clearer, the disclosure will be further described below in details by specific embodiments with reference to the accompanying drawings. The method for sequentially encrypting and decrypting singly linked lists based on double key stream ciphers in the disclosure is suitable for encryption and decryption.

FIG. 1 shows an overall flowchart according to an embodiment of the disclosure. A plaintext set M is established according to a plaintext file, wherein the plaintext can be any resolvable file. The plaintext set M is used as an initial set and sequentially iterative encryption is performed to obtain a ciphertext set C, wherein a reference string, a key set P and an algorithm set A are used jointly in the iterative encryption, and the reference string is $2^m$ bytes, where m>=0. The iterative encryption includes: acquiring any values of the plaintext set M, the ciphertext set C and the key set P as initial values and bit pointers corresponding to the initial values, performing two iterative encryptions on the plaintext set M through the bit pointers, the reference string and an encryption algorithm in the algorithm set A to obtain a ciphertext set C, wherein the plaintext set M and the key set P are not successive or hashed simultaneously as for a bit pointer used for encryption. For the ciphertext set C, performing multiple decryptions by calling the key set P, wherein the key set P and the algorithm set A are used during the encryption, wherein the key set P and the algorithm set A are shared by the encryption and the decryption, and the sets M and C are doubly circular linked lists, wherein the plaintext set M and the key set P are successive or hashed simultaneously as for a pointer used for encryption. The decryption includes: retrieving the iteratively encrypted initial value, establishing a bit pointer corresponding to the initial value, performing two decryptions on the ciphertext set C in combination with the reference string and an encryption algorithm in the algorithm set A to obtain a plaintext set M, and converting the plaintext set M into a plaintext file.

In this method, in order to realize decipherment, the following four conditions must be satisfied: 1. an algorithm program; 2. a ciphertext file (one cipher corresponding to one key); 3. a key file 1 (also referred to as a key); 4. a key file 2 (also referred to as a key). However, it is impossible to obtain the four files simultaneously. The method specifically includes definition, encryption and decryption.

(1) Attributes of Sets

Quadruple sets of encryption system (M, C, P, A) is provided. Also, the sets M, C, P and A have the following characteristics.

1. The information {0,1} in each set is a byte character set consisting of binary code elements, which is applied to ASCII codes.

2. The plaintext set M has n bytes, and the number of code elements is denoted as sum(M)=8n, then sum(M) mod 8=0.

3. For the number of elements in the ciphertext set C, $c_1$, $c_2$, $c_3$, ..., $c_r$, are obtained by r iterations on the set M used as initial values. For a subset $c_j$ (j=1, 2, 3, ..., r), the number of code elements is denoted as sum($c_j$), then sum($c_j$) mod 8=0. If the number of bytes in the subset $c_j$ is assumed as m, then:

when m<n, it is referred to as compressed encryption;

when m=n, it is referred to as one-to-one encryption or equidensite encryption; and when m>n, it is referred to as redundant encryption.

4. The number of code elements n the key set P is denoted as sum(P), then sum(P) nod 8=0. If the number of bytes in the set P is assumed as m, then m≤n. The number of bytes in the set P is preliminarily defined as 1. The encryption and the decryption shares the key set P. There are no codes in this set.

5. The algorithms in the definition have feasibility, definiteness, finiteness, input uniqueness and output uniqueness.

6. The algorithm set A is a set of computer-executable codes, also referred to as a set of functions. If the number of elements in the set A is denoted as sum(A), then sum(A) mod 2=0.

The algorithm is characterized in that:

if there is an algorithm a for encrypting $c_i$ into $c_j$, there must be an algorithm b for reverting $c_j$ to $c_i$, that is, there is an inverse algorithm or a reverting algorithm.

II. Encryption Principle

1. A plaintext set is set as follows:

$M=\{x_0x_1 \ldots x_{n-1}\}$, where $x_i=\{0,1\}$ and i satisfies a condition of $0 \le i \le n-1$. This set is an ordered set.

2. Key sets are set as follows:

$P_0=\{y0_0y0_1 \ldots y0_{n-1}\}$, where $y0_{j0}=\{0,1\}$, j0 satisfies a condition of $0 \le j0 \le n-1$, and this set is an ordered set; and $P_1=\{y1_0y1_1 \ldots y1_{n-1}\}$, where $y1_{j1}=\{0,1\}$, j1 satisfies a condition of $0 \le j1 \le n-1$, and this set is an ordered set.

3. Ciphertext sets are set as follows:

$C_0=\{z0_0z0_1 \ldots z0_{n-1}\}$, where $z0_{k0}=\{0,1\}$, k0 satisfies a condition of $0 \le k0 \le n-1$, and this set is an ordered set; and $C_1=\{z1_0z1_1 \ldots z1_{n-1}\}$, where $z1_{k1}=\{0,1\}$, k1 satisfies a condition of $0 \le k1 \le n-1$, and this set is an ordered set.

4. The set M is regarded as a circular linked list, and $x_{n-1}$ is followed by $x_0$.

5. The sets $P_0$ and $P_1$ are regarded as circular linked lists; for $P_0$, $y0_{n-1}$ is followed by $y0_0$; and for $P_1$, $y1_{n-1}$ is followed by $y1_0$.

6. The set $C_0$ is regarded as a circular linked list, and $z0_{n-1}$ is followed by $z0_0$.

7. The set $C_1$ is regarded as a circular linked list, and $z1_{n-1}$ is followed by $z1_0$.

8. Any initial value $i_0$ (where $0<=i_0<=n-1$) is used as an initial value of the set M, and this value is reserved.

9. Any initial value $i_1$ (where $0<=i_1<=n-1$) is used as an initial value of the set $C_0$, and this value is reserved.

10. Any initial value $j_0$ (where $0<=j_0<=n-1$) is used as an initial value of the set $P_0$, and this value is reserved.

12. Any initial value $k_0$ (where $0<=k_0<=n-1$) is used as an initial value of the set $C_0$, and this value is reserved.

13. Any initial value $k_1$ (where $0<=k_1<=n-1$) is used as an initial value of the set $C_1$, and this value is reserved.

14. A bit pointer p is established to point to an $x_i$ bit of the set M during first encryption.

15. A bit pointer q is established to point to a $y0_{j0}$ bit of the set $P_0$ during first encryption.

16. A bit pointer r is established to point to a $z0_{k0}$ bit of the set $C_0$ during first encryption.

17. A bit pointer p is established to point to an $x_{i1}$ bit of the set $C_0$ during second encryption.

18. A bit pointer q is established to point to a $y1_{j1}$ bit of the set $P_1$ during second encryption.

19. A bit pointer r is established to point to a $z1_{k1}$ bit of the set $C_1$ during second encryption.

In this encryption method, there are 16 specific encryption methods, wherein there are four failed encryption methods, and eight half-encryption methods, which are equivalent to these encryption methods performed by one key, so these encryption methods are discarded. Therefore, the double-key encryption can be realized by only four encryption methods.

Encryption method 1 (p is hashed and r is successive, p is hashed and r is successive):

First Encryption

1. First encryption is performed to let p to point to an $x_{i0}$ bit of the set M.

2. First encryption is performed to let q to a $y0_{j0}$ bit of the set $P_0$.

3. First encryption is performed to let r to point to a $z0_{k0}$ bit of the set $C_0$.

4. First traversal is performed; if it is determined that *q is true, *r=*p, p++, q++ and r++; or otherwise, q++ and p++.

5. The first traversal ends. The p point to the $x_{i0}$ bit of the set M. The q points to the $y0_{j0}$ bit of the set $P_0$.

6. Second traversal is performed; if it is determined that *q is false, *r=*p, p++, q++ and r++; or otherwise, q++ and p++.

7. The second traversal ends. A cipher $C_0$ is obtained. The $C_0$ is written into a cipher file, and the first encryption ends.

Second Encryption

1. First encryption is performed to let p to point to a $z0_{i1}$ bit of the set $C_0$.

2. First encryption is performed to let q to a $y1_{j1}$ bit of the set $P_1$.

3. First encryption is performed to let r to point to a $z1_{k1}$ bit of the set $C_1$.

4. First traversal is performed; if it is determined that *q is true, *r=*p, p++, q++ and r++; or otherwise, q++ and p++.

5. The first traversal ends. The p points to the $z0_{i1}$ bit of the set $C_0$. The q points to the $y1_{j1}$ bit of the set $P_0$.

6. Second traversal is performed; if it is determined that *q is false, *r=*p, p++, q++ and r++; or otherwise, q++ and p++.

7. The second traversal ends. A cipher $C_1$ is obtained. The $C_1$ is written into a cipher file, and the second encryption ends.

Encryption method 2 (p is hashed and r is successive, p is successive and r is hashed):

First Encryption

1. First encryption is performed to let p to point to an $x_{i0}$ bit of the set M.

2. First encryption is performed to let q to a $y0_{j0}$ bit of the set $P_0$.

3. First encryption is performed to let r to point to a $z0_{k0}$ bit of the set $C_0$.

4. First traversal is performed; if it is determined that *q is true, *r=*p, p++, q++ and r++; or otherwise, q++ and p++.

5. The first traversal ends. The p point to the $x_{i0}$ bit of the set M. The q points to the $y0_{j0}$ bit of the set $P_0$.

6. Second traversal is performed; if it is determined that *q is false, *r=*p, p++, q++ and r++; or otherwise, q++ and p++.

7. The second traversal ends. A cipher $C_0$ is obtained. The $C_0$ is written into a cipher file, and the first encryption ends.

Second Encryption

1. First encryption is performed to let p to point to a $z0_{i1}$ bit of the set $C_0$.

2. First encryption is performed to let q to a $y1_{j1}$ bit of the set $P_1$.

3. First encryption is performed to let r to point to a $z1_{k1}$ bit of the set $C_1$.

4. First traversal is performed; if it is determined that *q is true, *r=*p, p++, q++ and r++; or otherwise, q++ and r++.

5. The first traversal ends. The r points to the $z1_{k1}$ bit of the set $C_1$. The q points to the $y1_{j1}$ bit of the set $P_0$.

6. Second traversal is performed; if it is determined that *q is false, *r=*p, p++, q++ and r++; or otherwise, q++ and r++.

7. The second traversal ends. A cipher $C_1$ is obtained. The $C_1$ is written into a cipher file, and the second encryption ends.

Encryption method 3 (p is successive and r is hashed, p is hashed and r is successive):

First Encryption

1. First encryption is performed to let p to point to an $x_{i0}$ bit of the set M.

2. First encryption is performed to let q to a $y0_{j0}$ bit of the set $P_0$.

3. First encryption is performed to let r to point to a $z0_{k0}$ bit of the set $C_0$.

4. First traversal is performed; if it is determined that *q is true, *r=*p, p++, q++ and r++; or otherwise, q++ and r++.

5. The first traversal ends. The r points to the $z0_{k0}$ bit of the set $C_0$. The q points to the $y0_{j0}$ bit of the set $P_0$.

6. Second traversal is performed; if it is determined that *q is false, *r=*p, p++, q++ and r++; or otherwise, q++ and r++.

7. The second traversal ends. A cipher $C_0$ is obtained. The $C_0$ is written into a cipher file, and the first encryption ends.

Second Encryption

1. First encryption is performed to let p to point to a $z0_{i1}$ bit of the set $C_0$.

2. First encryption is performed to let q to a $y1_{j1}$ bit of the set $P_1$.

3. First encryption is performed to let r to point to a $z1_{k1}$ bit of the set $C_1$.

4. First traversal is performed; if it is determined that *q is true, *r=*p, p++, q++ and r++; or otherwise, p++ and q++.

5. The first traversal ends. The p points to the $z0_{i1}$ bit of the set $C_0$. The q points to the $y1_{j1}$ bit of the set $P_0$.

6. Second traversal is performed; if it is determined that *q is false, *r=*p, p++, q++ and r++; or otherwise, p++ and q++.

7. The second traversal ends. A cipher $C_1$ is obtained. The $C_1$ is written into a cipher file, and the second encryption ends.

Encryption method 4 (p is successive and r is hashed, p is successive and r is hashed):

First Encryption

1. First encryption is performed to let p to point to an $x_{i0}$ bit of the set M.

2. First encryption is performed to let q to a $y0_{j0}$ bit of the set $P_0$.

3. First encryption is performed to let r to point to a $z0_{k0}$ bit of the set $C_0$.

4. First traversal is performed; if it is determined that *q is true, *r=*p, p++, q++ and r++; or otherwise, q++ and r++.

5. The first traversal ends. The r points to the $z0_{k0}$ bit of the set $C_0$. The q points to the $y0_{j0}$ bit of the set $P_0$.

6. Second traversal is performed; if it is determined that *q is false, *r=*p, p++, q++ and r++; or otherwise, q++ and r++.

7. The second traversal ends. A cipher $C_0$ is obtained. The $C_0$ is written into a cipher file, and the first encryption ends.

Second Encryption

1. First encryption is performed to let p to point to a $z0_{i1}$ bit of the set $C_0$.

2. First encryption is performed to let q to a $y1_{j1}$ bit of the set $P_1$.

3. First encryption is performed to let r to point to a $z1_{k1}$ bit of the set $C_1$.

4. First traversal is performed; if it is determined that *q is true, *r=*p, p++, q++ and r++; or otherwise, q++ and r++.

5. The first traversal ends. The r points to the $z1_{k1}$ bit of the set $C_1$. The q points to the $y1_{j1}$ bit of the set $P_0$.

6. Second traversal is performed; if it is determined that *q is false, *r=*p, p++, q++ and r++; or otherwise, q++ and r++.

7. The second traversal ends. A cipher $C_1$ is obtained. The $C_1$ is written into a cipher file, and the second encryption ends.

III. Decryption Principle

Initial values $i_0$, $i_1$, $j_0$, $j_1$, $k_0$ and $k_1$ for encryption are retrieved.

Decryption method 1 (p is hashed and r is successive, p is hashed and r is successive):

First Decryption

1. First decryption is performed to let p to point to a $z0_{i1}$ bit of the set $C_0$.

2. First decryption is performed to let q to a $y1_{j1}$ bit of the set $P_1$.

3. First decryption is performed to let r to point to a $z1_{k1}$ bit of the set $C_1$.

4. First traversal is performed; if it is determined that *q is true, *p=*r, p++, q++ and r++; or otherwise, q++ and p++.

5. The first traversal ends. The p points to the $z0_{i0}$ bit of the set $C_0$. The q points to the $y1_{j1}$ bit of the set $P_0$.

6. Second traversal is performed; if it is determined that *q is false, *p=*r, p++, q++ and r++; or otherwise, q++ and p++.

7. The second traversal ends. The firstly decrypted cipher $C_0$ is obtained. The $C_0$ is written into a cipher file, and the first decryption ends.

Second Decryption

1. Second decryption is performed to let p to point to an $x_{i0}$ bit of the set M.

2. Second decryption is performed to let q to a $y0_{j0}$ bit of the set $P_0$.

3. Second decryption is performed to let r to point to a $z0_{k0}$ bit of the set $C_0$.

4. First traversal is performed; if it is determined that *q is true, *p=*r, p++, q++ and r++; or otherwise, q++ and p++.

5. The first traversal ends. The p point to the $x_{i0}$ bit of the set M. The q points to the $y0_{j0}$ bit of the set $P_0$.

6. Second traversal is performed; if it is determined that *q is false, *p=*r, p++, q++ and r++; or otherwise, q++ and p++.

7. The second traversal ends. A plain code M is obtained. The M is written into a plaintext file, and the decryption ends.

Decryption method 2 (p is hashed and r is successive, p is successive and r is hashed):

First Decryption

1. First decryption is performed to let p to point to a $z0_{i1}$ bit of the set $C_0$.

2. First decryption is performed to let q to a $y1_{j1}$ bit of the set $P_1$.

3. First decryption is performed to let r to point to a $z1_{k1}$ bit of the set $C_1$.

4. First traversal is performed; if it is determined that *q is true, *p=*r, p++, q++ and r++; or otherwise, q++ and r++.

5. The first traversal ends. The r points to the $z1_{i1}$ bit of the set $C_1$. The q points to the $y1_{j1}$ bit of the set $P_0$.

6. Second traversal is performed; if it is determined that *q is false, *p=*r, p++, q++ and r++; or otherwise, q++ and r++.

7. The second traversal ends. The firstly decrypted cipher $C_0$ is obtained. The $C_0$ is written into a cipher file, and the first decryption ends.

Second Decryption

1. First decryption is performed to let p to point to an $x_{i0}$ bit of the set M.

2. First decryption is performed to let q to a $y0_{j0}$ bit of the set $P_0$.

3. First decryption is performed to let r to point to a $z0_{k0}$ bit of the set $C_0$.

4. First traversal is performed; if it is determined that *q is true, *p=*r, p++, q++ and r++; or otherwise, q++ and p++.

5. The first traversal ends. The p point to the $x_{i0}$ bit of the set M. The q points to the $y0_{j0}$ bit of the set $P_0$.

6. Second traversal is performed; if it is determined that *q is false, *p=*r, p++, q++ and r++; or otherwise, q++ and p++.

7. The second traversal ends. A plain code M is obtained. The M is written into a plaintext file, and the decryption ends.

Decryption method 3 (p is successive and r is hashed, p is hashed and r is successive):

First Decryption

1. First decryption is performed to let p to point to a $z0_{i1}$ bit of the set $C_0$.

2. First decryption is performed to let q to a $y1_{j1}$ bit of the set $P_1$.

3. First decryption is performed to let r to point to a $z1_{k1}$ bit of the set $C_1$.

4. First traversal is performed; if it is determined that *q is true, *p=*r, p++, q++ and r++; or otherwise, p++ and q++.

5. The first traversal ends. The p points to the $z0_{i1}$ bit of the set $C_0$. The q points to the $y1_{j1}$ bit of the set $P_0$.

6. Second traversal is performed; if it is determined that *q is false, *p=*r, p++, q++ and r++; or otherwise, p++ and q++.

7. The second traversal ends. The firstly decrypted cipher $C_0$ is obtained. The $C_0$ is written into a cipher file, and the first decryption ends.

Second Decryption

1. First decryption is performed to let p to point to an $x_{i0}$ bit of the set M.

2. First decryption is performed to let q to a $y0_{j0}$ bit of the set $P_0$.

3. First decryption is performed to let r to point to a $z0_{k0}$ bit of the set $C_0$.

4. First traversal is performed; if it is determined that *q is true, *p=*r, p++, q++ and r++; or otherwise, q++ and r++.

5. The first traversal ends. The r points to the $z0_{k0}$ bit of the set $C_0$. The q points to the $y0_{j0}$ bit of the set $P_0$.

6. Second traversal is performed; if it is determined that *q is false, *p=*r, p++, q++ and r++; or otherwise, q++ and r++.

7. The second traversal ends. A plain code M is obtained. The M is written into a plaintext file, and the decryption ends.

Decryption method 4 (p is successive and r is hashed, p is successive and r is hashed):

First Decryption

1. First decryption is performed to let p to point to a $z0_{i1}$ bit of the set $C_0$.

2. First decryption is performed to let q to a $y1_{j1}$ bit of the set $P_1$.

3. First decryption is performed to let r to point to a $z1_{k1}$ bit of the set $C_1$.

4. First traversal is performed; if it is determined that *q is true, *p=*r, p++, q++ and r++; or otherwise, q++ and r++.

5. The first traversal ends. The r points to the $z1_{k1}$ bit of the set $C_1$. The q points to the $y1_{j1}$ bit of the set $P_0$.

6. Second traversal is performed; if it is determined that *q is false, *p=*r, p++, q++ and r++; or otherwise, q++ and r++.

7. The second traversal ends. The firstly decrypted cipher $C_0$ is obtained. The $C_0$ is written into a cipher file, and the first decryption ends.

Second Decryption

1. First decryption is performed to let p to point to an $x_{i0}$ bit of the set M.

2. First decryption is performed to let q to a $y0_{j0}$ bit of the set $P_0$.

3. First decryption is performed to let r to point to a $z0_{k0}$ bit of the set $C_0$.

4. First traversal is performed; if it is determined that *q is true, *p=*r, p++, q++ and r++; or otherwise, q++ and r++.

5. The first traversal ends. The r points to the $z0_{k0}$ bit of the set $C_0$. The q points to the $y0_{j0}$ bit of the set $P_0$.

6. Second traversal is performed; if it is determined that *q is false, *p=*r, p++, q++ and r++; or otherwise, q++ and r++.

7. The second traversal ends. A plain code M is obtained. The M is written into a plaintext file, and the decryption ends.

Compared with the prior art, this technology does not require any dedicated computer hardware or dedicated electronic logic device during the encryption of stream ciphers. The design of logic circuits is also not required. The feedback problems and feedback algorithms of chaotic signals are not involved. The encryption and decryption process of stream ciphers is completely solved by computer software programming. In this way, the requirements for the external conditions of the encryption and decryption of plain codes are very low. As long as there is a networked computer, encryption and decryption can be carried out. This technology is very high in applicability.

In this encryption technology, the longer the content of a protocol file (key) is, the more difficult the decryption is. In the existing technical specification, the length is 32 bytes. The length can also be increased to 64 bytes or 128 bytes, or even longer.

Software products developed by this technology can be applied to the information transmission of the diplomatic department and the information transmission of the military department, and also have good effects on remote control and image transmission encryption. Due to the high difficulty in decipherment, it is almost impossible to decipher during the secrecy process of plain codes.

In the encryption process, only one byte is used as a reference string. Such encryption is easy to decipher. However, when the reference string has 8 bytes, 16 bytes, 32 bytes or even 64 bytes, the difficulty of decipherment can be imagined. The length of the reference string can be the same as the length of bytes of the plaintext. Even for a successive byte, the difficulty of decipherment is also considerably high if multiple iterations could be performed.

Due to the development of the modern communication technology, it is no longer a problem to add a certain amount of transmission codes.

With reference to FIGS. 2-5, when the values of the bit points p and r are different, the detailed process of encrypting and decrypting the plaintext "中国" is described by specific embodiments. Specifically as follows:

In this method, encryption is realized by double keys, and the keys can be managed by different persons, so the plaintext is ensured to be securer.

1. M={"中国"} represents a plaintext, i.e., a text to be encrypted. {0xD6D0 0xB9FA} is machine codes of the two Chinese characters "中国", i.e., an input sequence to be encrypted.

2. P0={"玫瑰"} represents a key. {0xC3B5 0xB9E5} is machine codes of the two Chinese characters "玫瑰".

3. P1={"牡丹"} represents another key. {0xC4B5 0xB5A4} is machine codes of the two Chinese characters "牡丹".

4. $i_0=5$, $i_1=3$, $j_0=4$, $j_1=6$, $k_0=2$ and $k_1=1$ are selected as initial values.

5. The encryption method 1 is employed, and a ciphertext C0={0x9cb7,0xf62c} is obtained by the first encryption.

6. The encryption method 1 is employed, and a ciphertext C1={0x5bb6,0x67c5} is obtained by the second encryption.

Decryption Process
Description:

1. The initial values $i_0=5$, $i_1=3$, $j_0=4$, $j_1=6$, $k_0=2$ and $k_1=1$ are retrieved.

2. C1={0x5bb6,0x67c5} represents a ciphertext.

3. P1={"牡丹"}={0xC4B5 0xB5A4} is machine codes of the two Chinese characters "牡丹", i.e., the second key.

4. The firstly encrypted ciphertext C0={0x6E5B, 0Xf934} is obtained by the key P1 and the decryption method 1.

5. The firstly encrypted ciphertext C0={0x9cb7,0xf62c} is reverted by using the P0={"玫瑰"}={0xC3B5 0xB9E5} to obtain a plaintext M={"中国"}={0xD6D0 0xB9FA}.

Encryption and Decryption Algorithms
Encryption Process

1. A plaintext file M={"中国"}={0xD6 0xD0 0xB9 0xFA}=(1101 0110 1101 0000 1011 1000 1111 1010)$_2$.

A key file P0={"玫瑰"}={0xC3 0xB5 0xB9 0xE5}=(1100 0011 1011 0101 1011 1000 1110 0101)$_2$.

A key file P1={"牡丹"}={0xC4 0xB5 0xB5 0xA4}=(1100 0100 1011 0101 1011 0101 1010 0100)$_2$.

2. A character pointer char *p_str_M is established.
A character pointer char *p_str_P0 is established.
A character pointer char *p_str_P1 is established.
A character pointer char *p_str_C0 is established.
A character pointer char *p_str_C1 is established.

3. The plaintext file M is opened, and the number of bytes in the plaintext file M is counted and stored in the n.

4. A plaintext storage space p_str_M=(char *)malloc(n*sizeof(char)) is allocated.
A key storage space p_str_P0=(char *)malloc(n*sizeof(char)) is allocated.
A key storage space p_str_P1=(char *)malloc(n*sizeof(char)) is allocated.
A ciphertext storage space p_str_C0=(char *)malloc(n*sizeof(char)) is allocated.
A ciphertext storage space p_str_C1=(char *)malloc(n*sizeof(char)) is allocated.

5. The initial value i0=5 is fetched, i.e., starting from the $(x0_5)^{th}$ bit of the space pointed by the plaintext string M. This value is reserved. The reference is made to FIG. 2.

The initial value i1=3 is fetched, i.e., starting from the $(z0_3)^{th}$ bit of the space pointed by the ciphertext string C0. This value is reserved. The reference is made to FIG. 2.

The initial value j0=4 is fetched, i.e., starting from the $(y0_4)^{th}$ bit of the space pointed by the key string P0. This value is reserved. The reference is made to FIG. 2.

The initial value j1=6 is fetched, i.e., starting from the $(y1_6)^{th}$ bit of the space pointed by the key string P1. This value is reserved. The reference is made to FIG. 2.

The initial value k0=2 is fetched, i.e., starting from the $(z0_2)^{th}$ bit of the space pointed by the ciphertext string C0. This value is reserved. The reference is made to FIG. 2.

The initial value k1=1 is fetched, i.e., starting from the $(z1_1)^{th}$ bit of the space pointed by the ciphertext string C1. This value is reserved. The reference is made to FIG. 2.

6. The content of the plaintext file M is read into the storage space pointed by p_str_M. The p_str_M is allowed to point to a byte where i0=5 is located. When the pointer p_str_M points to a tail mark of the string and the encryption cycle still does not end, the pointer p_str_M points a first byte of this character string.

7. The content of the plaintext file P0 is read into the storage space pointed by p_str_P0. The p_str_P0 is allowed to point to a byte where j0=4 is located. When the pointer p_str_P0 points to a tail mark of the string and the encryption cycle still does not end, the pointer p_str_P0 points a first byte of this character string.

8. The content of the plaintext file P1 is read into the storage space pointed by p_str_P1. The p_str_P1 is allowed to point to a byte where j1=6 is located. When the pointer p_str_P1 points to a tail mark of the string and the encryption cycle still does not end, the pointer p_str_P1 points a first byte of this character string.

9. The ciphertext pointer p_str_C0 is allowed to point to the position of the initial value of k=2. When the pointer p_str_C0 points to a tail mark of the string and the encryption cycle still does not end, the pointer p_str_C0 points a first byte of this character string.

10. The ciphertext pointer p_str_C1 is allowed to point to the position of the initial value of k=1. When the pointer p_str_C1 points to a tail mark of the string and the encryption cycle still does not end, the pointer p_str_C1 points a first byte of this character string.

11. A function is established as follows:
int string_read_bit(char *p,int i).
This function returns the value (0,1) of the $i^{th}$ bit of the character string pointed by the p.

12. A function is established as follows:
void string_write_bit(char *p, int i, int j).
This function writes the $i^{th}$ bit of the character string pointed by the p into the value (0,1) of j.

13. First cycle
The pointer p_str_M points to a byte where the $x0_5$ bit is located. When a tail mark is encountered, it points to the first byte.

The pointer p_str_P0 points to a byte where the $y0_4$ bit is located. When a tail mark is encountered, it points to the first byte.

The pointer p_str_C0 points to a byte where the $z0_2$ bit is located. When a tail mark is encountered, it points to the first byte.

```
for(i=0;i<8*n;i++)
        {x = string_read_bit(p_str_P0,i);
    if(x)
        {z = string_read_bit(p_str_M,i);
    string_write_bit(p_str_C0,i,z);
    p_str_P0++; p_str_M++;p_str_C0++}
    else
            {p_str_P0++; p_str_M++;}
}
```

14. Second cycle

The pointer p_str_M points to a byte where the $x0_5$ bit is located. When a tail mark is encountered, it points to the first byte.

The pointer p_str_P0 points to a byte where the $y0_4$ bit is located. When a tail mark is encountered, it points to the first byte.

The pointer p_str_C0 points to a byte where the $z0_2$ bit is located. When a tail mark is encountered, it points to the first byte.

```
for(i=0;i<8*n;i++)
        {x = string_read_bit(p_str_P1,i);
    if(!x)
        {z = string_read_bit(p_str_M,i);
    string_write_bit(p_str_C,i,z);
        p_str_P0++; p_str_M++;p_str_C0++;}
    else
            {p_str_P0++; p_str_M++;}
}
```

15. Third cycle

The pointer p_str_C0 points to a byte where the $z0_3$ bit is located. When a tail mark is encountered, it points to the first byte.

The pointer p_str_P1 points to a byte where the $y1_6$ bit is located. When a tail mark is encountered, it points to the first byte.

The pointer p_str_C1 points to a byte where the $z1_1$ bit is located. When a tail mark is encountered, it points to the first byte.

```
for(i=0;i<8*n;i++)
        {x = string_read_bit(p_str_P1,i);
    if(x)
        {z = string_read_bit(p_str_C0,i);
    string_write_bit(p_str_C1,i,z);
    p_str_P0++; p_str_C0++;p_str_C1++}
    else
            {p_str_P1++; p_str_C0++;}
}
```

16. Fourth cycle

The pointer p_str_C0 points to a byte where the $z0_3$ bit is located. When a tail mark is encountered, it points to the first byte.

The pointer p_str_P1 points to a byte where the $y1_6$ bit is located. When a tail mark is encountered, it points to the first byte.

The pointer p_str_C1 points to a byte where the $z1_1$ bit is located. When a tail mark is encountered, it points to the first byte.

```
for(i=0;i<8*n;i++)
        {x = string_read_bit(p_str_P1,i);
    if(!x)
        {z = string_read_bit(p_str_M,i);
    string_write_bit(p_str_C1,i,z);
        p_str_P1++; p_str_C0++;p_str_C1++;}
    else
            {p_str_P1++; p_str_C0++;}
}
```

17. The p_str_C1 points to the first address of the allocated ciphertext storage space, and n bytes in this space are written into the ciphertext file C.

18. The ciphertext file C={"謁"}={0x5bb6 0x67c5}= (0101 1011 1101 0110 0110 0111 1100 0101)$_2$ is obtained.

19. The above process can refer to FIG. 2.

Decryption Process

1. A ciphertext file C={"謁"}={0xE967 0x633D}=(1101 1000 0101 0110 0100 1101 1011 1110)$_2$ A key file P0={"玫瑰"}={0xC3 0xB5 0xB9 0xE5}=(1100 0011 1011 0101 1011 1000 1110 0101)$_2$ A key file P1={"牡丹"}={0xC4 0xB5 0xB5 0xA4}=(1100 0100 1011 0101 1011 0101 1010 0100)$_2$ 2. A character pointer char *p_str_M is established.
A character pointer char *p_str_P0 is established.
A character pointer char *p_str_P1 is established.
A character pointer char *p_str_C0 is established.
A character pointer char *p_str_C1 is established.

3. The ciphertext file C is opened, and the number of bytes in the ciphertext file C is counted and stored in the n.

4. A plaintext storage space p_str_M=(char*)malloc (n*sizeof(char)) is allocated.

A key storage space p_str_P0=(char*)malloc(n*sizeof (char)) is allocated.

A key storage space p_str_P1=(char*)malloc(n*sizeof (char)) is allocated.

A ciphertext storage space p_str_C0=(char*)malloc (n*sizeof(char)) is allocated.

A ciphertext storage space p_str_C1=(char*)malloc (n*sizeof(char)) is allocated.

5. The reserved initial bit value i0=5 is retrieved, i.e., starting from the $(x0_5)^{th}$ bit of the plaintext string M. This value is reserved.

The reserved initial bit value i1=3 is retrieved, i.e., starting from the $(z0_3)^{th}$ bit of the ciphertext string C0. This value is reserved.

The reserved initial bit value j0=4 is retrieved, i.e., starting from the $(y0_4)^{th}$ bit of the key string P0. This value is reserved.

The reserved initial bit value j1=6 is retrieved, i.e., starting from the $(y1_6)^{th}$ bit of the key string P1. This value is reserved.

The reserved initial bit value k0=2 is retrieved, i.e., starting from the $(z0_2)^{th}$ bit of the ciphertext string C0. This value is reserved.

The reserved initial bit value k1=1 is retrieved, i.e., starting from the $(z1_1)^{th}$ bit of the ciphertext string C1. This value is reserved.

6. The content of the ciphertext file C (C1) is read into the storage space pointed by p_str_C1. The p_str_C1 is allowed to point to a byte where k1=1 is located. When the pointer p_str_C1 points to a tail mark of the string and the encryption cycle still does not end, the pointer p_str_C1 points a first byte of this character string. A ciphertext file C0 is obtained after the first decryption.

7. The content of the ciphertext file C0 is read into the storage space pointed by p_str_C0. The p_str_C0 is allowed to point to a byte where k0=2 is located. When the pointer p_str_C0 points to a tail mark of the string and the encryption circle still does not end, the pointer p_str_C0 points a first byte of this character string.

8. The content of the key file P1 is read into the storage space pointed by p_str_P1. The p_str_P1 is allowed to point to a byte where j1=6 is located. When the pointer p_str_P1 points to a tail mark of the string and the encryption circle still does not end, the pointer p_str_P1 points a first byte of this character string.

9. The content of the key file P0 is read into the storage space pointed by p_str_P0. The p_str_P0 is allowed to point to a byte where j1=4 is located. When the pointer p_str_P0 points to a tail mark of the string and the encryption circle still does not end, the pointer p_str_P0 points a first byte of this character string.

10. The plaintext pointer p_str_M points to a byte where the initial value i=5 is located. When the pointer p_str_M points to a tail mark of the string and the encryption circle still does not end, the pointer p_str_M points a first byte of this character string.

11. A function is established as follows:

int string_read_bit(char *p,int i).

This function returns the value (0,1) of the $i^{th}$ bit of the character string pointed by the p.

12. A function is established as follows:

void string_write_bit(char *p,int i,int j).

This function writes the $i^{th}$ bit of the character string pointed by the p into the value of j.

13. First cycle

The pointer p_str_C0 points to a byte where the $z0_3$ bit is located. When a tail mark is encountered, it points to the first byte.

The pointer p_str_P1 points to a byte where the $y1_6$ bit is located. When a tail mark is encountered, it points to the first byte.

The pointer p_str_C1 points to a byte where the $z1_1$ bit is located. When a tail mark is encountered, it points to the first byte.

```
for(i=0;i<8*n;i++)
        {x = string_read_bit(p_str_P1,i);
if(x)
     {z = string_read_bit(p_str_C1,i);
    string_write_bit(p_str_C0,i,z);
    p_str_P1++; p_str_C0++;p_str_C1++;}
else
        { p_str_P1++; p_str_C0++;}
}
```

14. Second cycle

The pointer p_str_C0 points to a byte where the $z0_3$ bit is located. When a tail mark is encountered, it points to the first byte.

The pointer p_str_P1 points to a byte where the $y1_6$ bit is located. When a tail mark is encountered, it points to the first byte.

The pointer p_str_C1 points to a byte where the $z1_1$ bit is located. When a tail mark is encountered, it points to the first byte.

```
for(i=0;i<8*n;i++)
        {x = string_read_bit(p_str_P1,i);
if(!x)
     {z = string_read_bit(p_str_C1,i);
    string_write_bit(p_str_C0,i,z);
    p_str_P1++; p_str_C0++;p_str_C1++;}
else
        {p_str_P1++; p_str_C0++;}
}
```

15. Third cycle

The pointer p_str_M points to a byte where the $x_5$ bit is located. When a tail mark is encountered, it points to the first byte.

The pointer p_str_P0 points to a byte where the $y0_4$ bit is located. When a tail mark is encountered, it points to the first byte.

The pointer p_str_C0 points to a byte where the $z0_2$ bit is located. When a tail mark is encountered, it points to the first byte.

```
for(i=0;i<8*n;i++)
        {x = string_read_bit(p_str_P0,i);
if(x)
     {z = string_read_bit(p_str_C0,i);
    string_write_bit(p_str_M,i,z);
    p_str_P0++; p_str_M++;p_str_C0++;}
else
        { p_str_P0++; p_str_M++;}
}
```

16. Fourth cycle

The pointer p_str_M points to a byte where the $x_5$ bit is located. When a tail mark is encountered, it points to the first byte.

The pointer p_str_P0 points to a byte where the $y0_4$ bit is located. When a tail mark is encountered, it points to the first byte.

The pointer p_str_C0 points to a byte where the $z0_2$ bit is located. When a tail mark is encountered, it points to the first byte.

```
for(i=0;i<8*n;i++)
        {x = string_read_bit(p_str_P0,i);
if(!x)
     {z = string_read_bit(p_str_C0,i);
    string_write_bit(p_str_M,i,z);
    p_str_P0++; p_str_M++;p_str_C0++;}
else
        {p_str_P0++; p_str_M++;}
}
```

17. The p_str_M points to the first address of the allocated plaintext storage space, and n bytes in this space are written into the plaintext file M.

18. The plaintext file M={"中国"}={0xD6 0xD0 0xB9 0xFA}=(1101 0110 1101 0000 1011 1000 1111 1010)$_2$ is obtained.

FIG. 6 shows a table of encryption combinations according to an embodiment of the disclosure. The encryption step of using the plaintext set M as an initial value and performing iterative encryption to obtain a ciphertext set C includes four failed encryption methods, eight half-encryption methods and four double-key encryption methods. All the failed encryption methods and the half-encryption methods are discarded, and the four double-key encryption method are executed, wherein the four double-key encryption methods include sequentially encrypting according to a pointer of a circular linked list.

In this method, there are 16 combinations in two-encryption mode, wherein 4 combinations are encrypted successfully in both encryptions, 4 combinations fail to encrypt in both encryptions, and 8 combinations are encrypted successfully in only one of the two encryptions. The 8 combinations are meaningless for the second encryption, so the 8 combinations are discarded. Only 4 combinations that are encrypted successfully in the two-encryption mode are reported. In the final state, "1" represents successful, and "0" represents failed.

The foregoing description merely shows the preferred embodiments of the disclosure, and the disclosure is not limited to the foregoing embodiments. All technical effects of the disclosure obtained by any identical means shall fall into the protection scope of the disclosure. Various different modifications and variations can be made to the technical solutions and/or embodiments within the protection scope of the disclosure.

The invention claimed is:

1. A method for sequentially encrypting and decrypting singly linked lists based on double key stream ciphers, comprising:

establishing a plaintext set M according to a plaintext file, wherein the plaintext can be any resolvable file;

using the plaintext set M as an initial set and performing sequentially iterative encryption to obtain a ciphertext set C, wherein a reference string, a key set P and an algorithm set A are used jointly in the iterative encryption, and the reference string is $2^m$ bytes, where m>=0 and m is a positive integer;

the iterative encryption carried out by a network computer comprises: acquiring any values of the plaintext set M, the ciphertext set C and the key set P as initial values and bit pointers corresponding to the initial values, performing $2^m$ iterative encryptions on the plaintext set M through the bit pointers, the reference string and an encryption algorithm in the algorithm set A to obtain a ciphertext set C, wherein the plaintext set M and the key set P are not successive or hashed simultaneously as for a bit pointer used for encryption;

for the ciphertext set C, performing multiple decryptions by calling the key set P, wherein the key set P and the algorithm set A are used during the encryption, wherein the key set P and the algorithm set A are shared by the encryption and the decryption, and the sets M and C are doubly circular linked lists, wherein the plaintext set M and the key set P are not successive or hashed simultaneously as for a bit pointer used for encryption; and wherein the decryption carried out by a network computer comprises: retrieving the iteratively encrypted initial values, establishing bit pointers corresponding to the initial values, performing two decryptions on the ciphertext set C in combination with the reference string and the encryption algorithm in the algorithm set A to obtain the plaintext set M, and converting the plaintext set M into a plaintext file.

2. The method for sequentially encrypting and decrypting singly linked lists based on double key stream ciphers according to claim 1, wherein all the plaintext set M, the ciphertext set C, the key set P and the algorithm set A are character sets consisting of binary code elements.

3. The method for sequentially encrypting and decrypting singly linked lists based on double key stream ciphers according to claim 1, wherein establishing a plaintext set M according to a plaintext file comprises:

reading a plaintext file to obtain the number of bytes n of the plaintext file; and establishing a plaintext set M that is an ordered set, wherein $M=\{x_0 x_1 \wedge x_{n-1}\}$, where $x_i=\{0,1\}$ and i satisfies a condition of $0<=i<=n-1$, and as a circular linked list, for the M, $x_{n-1}$ is followed by $x_0$.

4. The method for sequentially encrypting and decrypting singly linked lists based on double key stream ciphers according to claim 3, wherein the method further comprises:

the key set P comprises a first key subset and a second key subset, wherein the first key subset is $P_0=\{y0_0 y0_1 \wedge y0_{n-1}\}$, where $y0_{j0}=\{0,1\}$, j0 satisfies a condition of $0<=j0<=n-1$, and $P_0$ is an ordered set; the second key subset is $P_1=\{y1_0 y1_1 \wedge y1_{n-1}\}$, where $y1_{j1}=\{0,1\}$, j1 satisfies a condition of $0<=j1<=n-1$, and $P_1$ is an ordered set; the first key subset $P_0$ and the second key subset are singly circular linked lists; for $P_0$, $y0_{n-1}$ is followed by $y0_0$; and for $P_1$, $y1_{n-1}$ is followed by $y1$; and, both the set $P_0$ and the set $P_1$ are singly circular linked lists.

5. The method for sequentially encrypting and decrypting singly linked lists based on double key stream ciphers according to claim 4, wherein the method further comprises:

the ciphertext set C comprises a first ciphertext subset and a second ciphertext subset, wherein the first ciphertext subset is $C_0=\{z0_0 z0_1 \wedge z0_{n-1}\}$, where $y0_{k0}=\{0,1\}$, k0 satisfies a condition of $0<=k0<=n-1$, and $C_0$ is an ordered set; the second key subset is $C_1=\{z1_0 z1_1 \wedge z1_{n-1}\}$, where $z1_{k1}=\{0,1\}$, k1 satisfies a condition of $0<=k1<=n-1$, and $C_1$ is an ordered set; the first key set $C_0$ and the second key set $C_1$ are singly circular linked lists; for $C_0$, $z0_{n-1}$ is followed by $zo_0$; and for $C_1$, $z1_{n-1}$ is followed by $z1_0$.

6. The method for sequentially encrypting and decrypting singly linked lists based on double key stream ciphers according to claim 1, wherein the method further comprises:

encryption step of using the plaintext set M as an initial value and performing iterative encryption to obtain a ciphertext set C comprises four failed encryption methods, eight half-encryption methods and four double-key encryption methods, all the failed encryption methods and the half-encryption methods are discarded, and the four double-key encryption method are executed, wherein the four double-key encryption methods comprise sequentially encrypting according to a pointer of a circular linked list.

7. The method for sequentially encrypting and decrypting singly linked lists based on double key stream ciphers according to claim 5, wherein the method further comprises:

using any initial value $i_0$ (where $0<=i_0<=n-1$) as an initial value of the set M, and reserving this initial value;

using any initial value $i_1$ (where $0<=i_1<=n-1$) as an initial value of the set $C_0$, and reserving this initial value;

using any initial value $j_0$ (where $0<=j_0<=n-1$) as an initial value of the set $P_0$, and reserving this initial value;

using any initial value $j_1$ (where $0<=j_1<=n-1$) as an initial value of the set $P_1$, and reserving this initial value;

using any initial value $k_0$ (where $0<=k_0<=n-1$) as an initial value of the set $C_0$, and reserving this initial value;

using any initial value $k_1$ (where $0<=k_1<=n-1$) as an initial value of the set $C_1$, and reserving this initial value;

establishing a bit pointer p, and performing first encryption to let the p to point to an $x_i$ bit of the set M;

establishing a bit pointer q, and performing first encryption to let the q to point to a $y0_{j0}$ bit of the set $P_0$;

establishing a bit pointer r, and performing first encryption to let the r to point to a $z0_{k0}$ bit of the set $C_0$;

establishing a bit pointer p, and performing second encryption to let the p to point to an $x_{i1}$ bit of the set $C_0$;

establishing a bit pointer q, and performing second encryption to let the q to point to a $y1_{j1}$ bit of the set $P_1$; and establishing a bit pointer r, and performing second encryption to let the r to point to a $z1_{k1}$ bit of the set $C_1$.

8. The method for sequentially encrypting and decrypting singly linked lists based on double key stream ciphers according to claim 7, wherein the method further comprises:

a first encryption method, comprising a first encryption step and a second encryption step, wherein the first encryption step comprises:

performing first encryption to let the p to point to an $x_{i0}$ bit of the set M;

performing first encryption to let the q to point to a $y0_{j0}$ bit of the set $P_0$;

performing first encryption to let the r to point to a $z0_{k0}$ bit of the set $C_0$;

performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M, and letting the q to point to the $y0_{j0}$ bit of the set $P_0$; and performing second traversal, judging whether *q is false, letting *r=*p and letting p, q and r to increase progressively if *q is false, letting p and q to increase progressively if *q is not false, ending the second traversal, obtaining encrypted $C_0$, writing the encrypted $C_0$ into a file, and ending the first encryption step; and the second encryption step comprises:

performing first encryption to let the p to point to a $z0_{i1}$ bit of the encrypted set $C_0$;

performing first encryption to let the q to point to a $y1_{j1}$ bit of the set $P_1$;

performing first encryption to let the r to point to a $z1_{k1}$ bit of the set $C_1$;

performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and performing second traversal, judging whether *q is false, letting *r=*p and letting p, q and r to increase progressively if *q is false, letting p and q to increase progressively if *q is not false, ending the second traversal, obtaining encrypted $C_1$, writing the encrypted $C_1$ into a file, and ending the second encryption step;

wherein p is hashed and r is successive in the first encryption step, and p is hashed and r is successive in the second encryption step.

9. The method for sequentially encrypting and decrypting singly linked lists based on double key stream ciphers according to claim 7, wherein the method further comprises:

a first encryption method, comprising a first encryption step and a second encryption step, wherein the first encryption step comprises:

performing first encryption to let the p to point to an $x_{i0}$ bit of the set M;

performing first encryption to let the q to point to a $y0_{j0}$ bit of the set $P_0$;

performing first encryption to let the r to point to a $z0_{k0}$ bit of the set $C_0$;

performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M, and letting the q to point to the $y0_{j0}$ bit of the set $P_0$; and performing second traversal, judging whether *q is false, letting *r=*p and letting p, q and r to increase progressively if *q is false, letting p and q to increase progressively if *q is not false, ending the second traversal, obtaining encrypted $C_0$, writing the encrypted $C_0$ into a file, and ending the first encryption step; and the second encryption step comprises:

performing first encryption to let the p to point to a $z0_{i1}$ bit of the encrypted $C_0$;

performing first encryption to let the q to point to a $y1_{j1}$ bit of the set $P_1$;

performing first encryption to let the r to point to a $z1_{k1}$ bit of the set $C_1$;

performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and performing second traversal, judging whether *q is false, letting *r=*p and letting p, q and r to increase progressively if *q is false, letting p and q to increase progressively if *q is not false, ending the second traversal, obtaining encrypted $C_1$, writing the encrypted $C_1$ into a file, and ending the second encryption step;

wherein p is hashed and r is successive in the first encryption step, and p is successive and r is hashed in the second encryption step.

10. The method for sequentially encrypting and decrypting singly linked lists based on double key stream ciphers according to claim 7, wherein the method further comprises:

a first encryption method, comprising a first encryption step and a second encryption step, wherein the first encryption step comprises:

performing first encryption to let the p to point to an $x_{i0}$ bit of the set M;

performing first encryption to let the q to point to a $y0_{j0}$ bit of the set $P_0$;

performing first encryption to let the r to point to a $z0_{k0}$ bit of the set $C_0$;

performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M, and letting the q to point to the $y0_{j0}$ bit of the set $P_0$; and performing second traversal, judging whether *q is false, letting *r=*p and letting p, q and r to increase progressively if *q is false, letting p and q to increase progressively if *q is not false, ending the second traversal, obtaining encrypted $C_0$, writing the encrypted $C_0$ into a file, and ending the first encryption step; and the second encryption step comprises:

performing first encryption to let the p to point to a $z0_{i1}$ bit of the encrypted $C_0$;

performing first encryption to let the q to point to a $y1_{j1}$ bit of the set $P_1$;

performing first encryption to let the r to point to a $z1_{k1}$ bit of the set $C_1$;

performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and performing second traversal, judging whether *q is false, letting *r=*p and letting p, q and r to increase progressively if *q is false, letting p and q to increase progressively if *q is not false, ending the second traversal, obtaining encrypted $C_1$, writing the encrypted $C_1$ into a file, and ending the second encryption step;

wherein p is successive and r is hashed in the first encryption step, and p is hashed and r is successive in the second encryption step.

11. The method for sequentially encrypting and decrypting singly linked lists based on double key stream ciphers according to claim 7, wherein the method further comprises:

a first encryption method, comprising a first encryption step and a second encryption step, wherein the first encryption step comprises:

performing first encryption to let the p to point to an $x_{i0}$ bit of the set M;

performing first encryption to let the q to point to a $y0_{j0}$ bit of the set $P_0$;

performing first encryption to let the r to point to a $z0_{k0}$ bit of the set $C_0$;

performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M, and letting the q to point to the $y0_{j0}$ bit of the set $P_0$; and performing second traversal, judging whether *q is false, letting *r=*p and letting p, q and r to increase progressively if *q is false, letting p and q to increase progressively if *q is not false, ending the second traversal, obtaining encrypted $C_0$, writing the encrypted $C_0$ into a file, and ending the first encryption step; and the second encryption step comprises:

performing first encryption to let the p to point to a $z0_{i1}$ bit of the encrypted $C_0$;

performing first encryption to let the q to point to a $y1_{j1}$ bit of the set $P_1$;

performing first encryption to let the r to point to a $z1_{k1}$ bit of the set $C_1$;

performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and performing second traversal, judging whether *q is false, letting *r=*p and letting p, q and r to increase progressively if *q is false, letting p and q to increase progressively if *q is not false, ending the second traversal, obtaining encrypted $C_1$, writing the encrypted $C_1$ into a file, and ending the second encryption step;

wherein p is successive and r is hashed in the first encryption step, and p is successive and r is hashed in the second encryption step.

12. The method for sequentially encrypting and decrypting singly linked lists based on double key stream ciphers according to claim 8, further comprising decryption methods corresponding to the double-key encryption methods, wherein the decryption methods comprises:

retrieving initial values $i_0$, $i_1$, $j_0$, $j_1$, $k_0$ and $k_1$ for decryption;

a first decryption method comprising a first decryption step and a second decryption step, wherein the first decryption step comprises:

performing first decryption to let the p to point to a $z0_{i1}$ bit of the encrypted set $C_0$;

performing first decryption to let the q to point to a $y1_{j1}$ bit of the set $P_1$;

performing first decryption to let the r to point to a $z1_{k1}$ bit of the set $C_1$;

performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and performing second traversal, judging whether *q is false, letting *r=*p and letting p, q and r to increase progressively if *q is false, letting p and q to increase progressively if *q is not false, ending the second traversal, obtaining decrypted $C_0$, writing the decrypted $C_0$ into a cipher file, and ending the first decryption step; and the second decryption step comprises:

performing second encryption to let the p to point to an $x_{i0}$ bit of the set M;

performing second encryption to let the q to point to a $y0_{j0}$ bit of the set $P_0$;

performing second encryption to let the r to point to a $z0_{k0}$ bit of the set $C_0$;

performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M, and letting the q to point to the $y0_{j0}$ bit of the set $P_0$; and performing second traversal, judging whether *q is false, letting *r=*p and letting p, q and r to increase progressively if *q is false, letting p and q to increase progressively if *q is not false, ending the second traversal, obtaining a plaintext set M, writing the decrypted plaintext set M into a plaintext file, and ending the second decryption step;

wherein p is hashed and r is successive in the first decryption step, and p is hashed and r is successive in the second decryption step.

13. The method for sequentially encrypting and decrypting singly linked lists based on double key stream ciphers according to claim 9, further comprising decryption methods corresponding to the double-key encryption methods, wherein the decryption methods comprises:

retrieving initial values $i_0$, $i_1$, $j_0$, $j_1$, $k_0$ and $k_1$ for decryption;

a first decryption method comprising a first decryption step and a second decryption step, wherein the first decryption step comprises:

performing first decryption to let the p to point to a $z0_{i1}$ bit of the encrypted set $C_0$;

performing first decryption to let the q to point to a $y1_{j1}$ bit of the set $P_1$;

performing first decryption to let the r to point to a $z1_{k1}$ bit of the set $C_1$;

performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and performing second traversal, judging whether *q is false, letting *r=*p and letting p, q and r to increase progressively if *q is false, letting p and q to increase progressively if *q is not false, ending the second traversal, obtaining decrypted $C_0$, writing the decrypted $C_0$ into a cipher file, and ending the first decryption step; and the second decryption step comprises:

performing second encryption to let the p to point to an $x_{i0}$ bit of the set M;

performing second encryption to let the q to point to a $y0_{j0}$ bit of the set $P_0$;

performing second encryption to let the r to point to a $z0_{k0}$ bit of the set $C_0$;

performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M, and letting the q to point to the $y0_{j0}$ bit of the set $P_0$; and performing second traversal, judging whether *q is false, letting *r=*p and letting p, q and r to increase progressively if *q is false, letting p and q to increase progressively if *q is not false, ending the second traversal, obtaining a plaintext set M, writing the decrypted plaintext set M into a plaintext file, and ending the second decryption step;

wherein p is hashed and r is successive in the first decryption step, and p is successive and r is hashed in the second decryption step.

14. The method for sequentially encrypting and decrypting singly linked lists based on double key stream ciphers according to claim 10, further comprising decryption methods corresponding to the double-key decryption methods, wherein the decryption methods comprises:

retrieving initial values $i_0$, $i_1$, $j_0$, $j_1$, $k_0$ and $k_1$ for decryption;

a first decryption method comprising a first decryption step and a second decryption step, wherein the first decryption step comprises:

performing first decryption to let the p to point to a $z0_{i1}$ bit of the encrypted set $C_0$;

performing first decryption to let the q to point to a $y1_{j1}$ bit of the set $P_1$;

performing first decryption to let the r to point to a $z1_{k1}$ bit of the set $C_1$;

performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and performing second traversal, judging whether *q is false, letting *r=*p and letting p, q and r to increase progressively if *q is false, letting p and q to increase progressively if *q is not false, ending the second traversal, obtaining decrypted $C_0$, writing the decrypted $C_0$ into a cipher file, and ending the first decryption step; and the second decryption step comprises:

performing second encryption to let the p to point to an $x_{i0}$ bit of the set M;

performing second encryption to let the q to point to a $y0_{j0}$ bit of the set $P_0$;

performing second encryption to let the r to point to a $z0_{k0}$ bit of the set $C_0$;

performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M, and letting the q to point to the $y0_{j0}$ bit of the set $P_0$; and performing second traversal, judging whether *q is false, letting *r=*p and letting p, q and r to increase progressively if *q is false, letting p and q to increase progressively if *q is not false, ending the second traversal, obtaining a plaintext set M, writing the decrypted plaintext set M into a plaintext file, and ending the second decryption step;

wherein p is successive and r is hashed in the first decryption step, and p is hashed and r is successive in the second decryption step.

15. The method for sequentially encrypting and decrypting singly linked lists based on double key stream ciphers according to claim 11, further comprising decryption methods corresponding to the double-key decryption methods, wherein the decryption methods comprises:

retrieving initial values $i_0$, $i_1$, $j_0$, $j_1$, $k_0$ and $k_1$ for decryption;

a first decryption method comprising a first decryption step and a second decryption step, wherein the first decryption step comprises:

performing first decryption to let the p to point to a $z0_{i1}$ bit of the encrypted set $C_0$;

performing first decryption to let the q to point to a $y1_{j1}$ bit of the set $P_1$;

performing first decryption to let the r to point to a $z1_{k1}$ bit of the set $C_1$;

performing first traversal, judging whether *q is true, letting *r=*p and letting p, q and r to increase progressively if *q is true, letting p and q to increase progressively if *q is not true, ending the first traversal, letting the p to point to the $z0_{i1}$ bit of the encrypted set $C_0$, and letting the q to point to the $y1_{j1}$ bit of the set $P_0$; and performing second traversal, judging whether *q is false, letting *r=*p and letting p, q and r to increase progressively if *q is false, letting p and q to increase progressively if *q is not false, ending the second traversal, obtaining decrypted $C_0$, writing the decrypted $C_0$ into a cipher file, and ending the first decryption step; and the second decryption step comprises:

performing second encryption to let the p to point to an $x_{i0}$ bit of the set M;

performing second encryption to let the q to point to a $y0_{j0}$ bit of the set $P_0$;

performing second encryption to let the r to point to a $z0_{k0}$ bit of the set $C_0$;

performing first traversal, judging whether *q is true, letting *r=*p and letting p, q and r to increase progressively if *q is true, letting p and q to increase progressively if *q is not true, ending the first traversal, letting the p to point to the $x_{i0}$ bit of the set M, and letting the q to point to the $y0_{j0}$ bit of the set $P_0$; and performing second traversal, judging whether *q is false, letting *r=*p and letting p, q and r to increase progressively if *q is false, letting p and q to increase progressively if *q is not false, ending the second traversal, obtaining a plaintext set M, writing the decrypted plaintext set M into a plaintext file, and ending the second decryption step;

wherein p is successive and r is hashed in the first decryption step, and p is successive and r is hashed in the second decryption step.

16. The method for sequentially encrypting and decrypting singly linked lists based on double key stream ciphers according to claim 1, wherein the algorithm set A comprises at least one pair of an encryption algorithm and a corresponding decryption algorithm; and, the number of elements in the algorithm set A is denoted as sum(A), and sum(A) mod 2=0.

17. The method for sequentially encrypting and decrypting singly linked lists based on double key stream ciphers according to claim 1, wherein a key file corresponding to the key set P comprises, but not limited to: a piece of audio, a video, a picture, an image, a graph, a pseudorandom code and a chaotic value.

* * * * *